US009277000B2

(12) United States Patent
Duggal

(10) Patent No.: US 9,277,000 B2
(45) Date of Patent: Mar. 1, 2016

(54) PROVIDING A USER WITH VIRTUAL COMPUTING SERVICES

(71) Applicant: nHoldings SA, Le Mont-sur-Lausanne (CH)

(72) Inventor: Sachin Duggal, London (GB)

(73) Assignee: nHoldings SA, Le Mont-sur-Lausanne (CH)

( * ) Notice: Subject to any disclaimer, the term of this patent is extended or adjusted under 35 U.S.C. 154(b) by 0 days.

(21) Appl. No.: 14/277,397

(22) Filed: May 14, 2014

(65) Prior Publication Data

US 2014/0250170 A1    Sep. 4, 2014

Related U.S. Application Data

(63) Continuation of application No. 13/476,980, filed on May 21, 2012, now Pat. No. 8,756,293, which is a continuation-in-part of application No. 12/782,660, filed on May 18, 2010, now Pat. No. 8,185,581, and a continuation-in-part of application No. 11/845,948, filed on Aug. 28, 2007, now abandoned.

(60) Provisional application No. 61/179,636, filed on May 19, 2009, provisional application No. 60/945,916, filed on Jun. 23, 2007, provisional application No. 60/913,348, filed on Apr. 23, 2007.

(51) Int. Cl.
*G06F 15/16* (2006.01)
*H04L 29/08* (2006.01)
*G06F 9/46* (2006.01)
*G06Q 10/10* (2012.01)
(Continued)

(52) U.S. Cl.
CPC ................ *H04L 67/10* (2013.01); *G06F 9/468* (2013.01); *G06Q 10/10* (2013.01); *G06Q 30/02* (2013.01); *G06Q 30/0207* (2013.01); *G06Q 30/0269* (2013.01); *G06Q 50/10* (2013.01); *H04L 29/06537* (2013.01); *H04L 29/0872* (2013.01); *H04L 29/06551* (2013.01); *H04Q 1/00* (2013.01); *Y10S 379/901* (2013.01)

(58) Field of Classification Search
USPC .......................................... 709/203, 219, 241
See application file for complete search history.

(56) References Cited

U.S. PATENT DOCUMENTS 5,742,683 A   4/1998   Lee et al.
5,771,354 A   6/1998   Crawford
(Continued)

FOREIGN PATENT DOCUMENTS

JP      2001061020 A    3/2001
KR    1020060018031 A   2/2006
(Continued)

OTHER PUBLICATIONS

Baratto, R. A. et al., "Mobidesk: Mobile Virtual Desktop Computing," MobiCom 2004, Sep. 26-Oct. 1, 2004 Philadelphia, PA, ACM, pp. 1-15.

(Continued)

*Primary Examiner* — Michael Y Won
(74) *Attorney, Agent, or Firm* — Perkins Coie LLP

(57) ABSTRACT

Systems and methods for providing a user with virtual computing services are disclosed. In one embodiment, a method for providing virtual computing services to a specific user, may comprising: detecting a request generated from a user device of the specific user to access data; in which the data is not accessible by applications installed on the user device; identifying a file type of the data; and providing the specific user access to a remote application or a virtual desktop, in which the remote application or the virtual desktop is configured to allow the specific user to open, execute, edit, and/or access the data.

8 Claims, 23 Drawing Sheets

(51) Int. Cl.
*G06Q 30/02* (2012.01)
*G06Q 50/10* (2012.01)
*H04L 29/06* (2006.01)
*H04Q 1/00* (2006.01)

(56) References Cited

U.S. PATENT DOCUMENTS

| | | | |
|---|---|---|---|
| 5,968,176 | A | 10/1999 | Nessett et al. |
| 6,216,112 | B1 | 4/2001 | Fuller et al. |
| 6,304,913 | B1 | 10/2001 | Rune et al. |
| 6,523,036 | B1 | 2/2003 | Hickman et al. |
| 6,807,550 | B1 * | 10/2004 | Li et al. ............... 707/796 |
| 6,980,969 | B1 | 12/2005 | Tuchler et al. |
| 7,096,253 | B2 | 8/2006 | Vinson et al. |
| 7,249,054 | B2 | 7/2007 | Keil |
| 7,421,702 | B1 | 9/2008 | Margulis et al. |
| 7,478,035 | B1 | 1/2009 | Wrench et al. |
| 7,512,799 | B1 | 3/2009 | Chow et al. |
| 8,065,680 | B2 * | 11/2011 | Parvathaneni et al. ....... 718/102 |
| 8,090,797 | B2 | 1/2012 | Chinta et al. |
| 8,112,505 | B1 | 2/2012 | Ben-Shaul et al. |
| 2001/0047406 | A1 | 11/2001 | Araujo et al. |
| 2001/0054157 | A1 | 12/2001 | Fukumoto et al. |
| 2002/0091697 | A1 | 7/2002 | Huang et al. |
| 2002/0102993 | A1 | 8/2002 | Hendrey et al. |
| 2002/0124137 | A1 | 9/2002 | Ulrich et al. |
| 2002/0174010 | A1 | 11/2002 | Rice, III |
| 2002/0196279 | A1 | 12/2002 | Bloomfield et al. |
| 2003/0065676 | A1 | 4/2003 | Gbadegesin et al. |
| 2005/0021771 | A1 * | 1/2005 | Kaehn et al. ............... 709/228 |
| 2006/0136389 | A1 | 6/2006 | Cover et al. |
| 2006/0143350 | A1 * | 6/2006 | Miloushev et al. ........... 710/242 |
| 2006/0149677 | A1 | 7/2006 | Shahine et al. |
| 2006/0168136 | A1 * | 7/2006 | Bethlehem et al. ........... 709/219 |
| 2006/0184652 | A1 | 8/2006 | Teodosiu et al. |
| 2006/0265258 | A1 * | 11/2006 | Powell et al. ............... 705/7 |
| 2007/0038520 | A1 * | 2/2007 | Grey et al. ............... 705/26 |
| 2007/0083620 | A1 | 4/2007 | Pedersen et al. |
| 2007/0192329 | A1 | 8/2007 | Croft et al. |
| 2008/0201225 | A1 | 8/2008 | Maharajh et al. |
| 2009/0013029 | A1 * | 1/2009 | Childress et al. ............ 709/203 |
| 2009/0132368 | A1 | 5/2009 | Cotter et al. |
| 2009/0133014 | A1 * | 5/2009 | Laurila et al. ............... 717/174 |
| 2010/0011060 | A1 * | 1/2010 | Hilterbrand et al. ......... 709/204 |
| 2010/0198732 | A1 | 8/2010 | Sim et al. |
| 2010/0322255 | A1 * | 12/2010 | Hao et al. ............... 370/398 |
| 2010/0325666 | A1 | 12/2010 | Wiser et al. |
| 2011/0185398 | A1 * | 7/2011 | Kubota ............... 726/3 |
| 2011/0209064 | A1 | 8/2011 | Jorgensen et al. |
| 2012/0166597 | A1 * | 6/2012 | Babey et al. ............... 709/220 |
| 2012/0226998 | A1 * | 9/2012 | Friedl et al. ............... 715/760 |
| 2013/0304880 | A1 * | 11/2013 | Lin et al. ............... 709/220 |

FOREIGN PATENT DOCUMENTS

| | | |
|---|---|---|
| WO | 2007060680 A3 | 11/2007 |
| WO | 2007132471 A1 | 11/2007 |
| WO | 2008059510 B1 | 5/2008 |
| WO | 2008012829 B1 | 10/2008 |
| WO | 2008059535 A3 | 1/2009 |
| WO | 2008059511 A3 | 4/2009 |

OTHER PUBLICATIONS

Zhang, et al., "Redar: A Remote Desktop Architecture for the Distributed Virtual Personal Computing," GCC '06, IEEE, pp. 1-8, 2006.
Final Office Action mailed Feb. 19, 2010 in U.S. Appl. No. 11/845,948 of Duggal, S.D., filed Aug. 28, 2007.
Final Office Action mailed Nov. 29, 2012, in U.S. Appl. No. 13/425,287 of Duggal, S.D., filed Mar. 20, 2012.
Final Office mailed Mar. 21, 2012 in U.S. Appl. No. 11/845,948 of Duggal, S.D., filed Aug. 28, 2007.
Final Office mailed Mar. 7, 2011 in U.S. Appl. No. 11/845,948 of Duggal, S.D., filed Aug. 28, 2007.
Non-Final Office mailed Sep. 24, 2012 in U.S. Appl. No. 11/845,948 of Duggal, S.D., filed Aug. 28, 2007.
Non-Final Office Action mailed Jun. 25, 2010 in U.S. Appl. No. 11/845,948 of Duggal, S.D., filed Aug. 28, 2007.
Non-Final Office Action mailed Jun. 27, 2012 in U.S. Appl. No. 13/425,287 of Duggal, S.D., filed Mar. 20, 2012.
Non-Final Office Action mailed Sep. 30, 2009 in U.S. Appl. No. 11/845,948 of Duggal, S.D., filed Aug. 28, 2007.
Non-Final Office Action mailed Sep. 6, 2011 in U.S. Appl. No. 11/845,948 of Duggal, S.D., filed Aug. 28, 2007.
Notice of Allowance mailed Apr. 30, 2014, in U.S. Appl. No. 13/476,980 of Duggal, S.D., filed May 21, 2012.
Notice of Allowance mailed Mar. 27, 2012 in U.S. Appl. No. 12/782,660 of Duggal, S.D., filed May 18, 2010.
Notice of Allowance mailed Nov. 20, 2012 in U.S. Appl. No. 13/476,971 of Duggal, S.D., filed May 21, 2012.
Restriction Requirement mailed Feb. 8, 2012 in U.S. Appl. No. 12/782,660 of Duggal, S.D., filed May 18, 2010.
U.S. Appl. No. 11/845,948 of Duggal, S.D., filed Aug. 28, 2007.
U.S. Appl. No. 12/782,660 of Duggal, S.D., filed May 18, 2010.
U.S. Appl. No. 13/425,287 of Duggal, S.D., filed Mar. 20, 2012.
U.S. Appl. No. 13/476,971 of Duggal, S.D., filed May 21, 2012.
U.S. Appl. No. 13/476,980 of Duggal, S.D., filed May 21, 2012.
International Search Report and Written Opinion for PCT/US2010/035308 mailed Dec. 6, 2010.
International Search Report and Written Opinion for PCT/IB2008/002534 mailed May 15, 2009.
European Search Report EP 08 15 0914.3 mailed May 30, 2008, pp. 1-8.

* cited by examiner

FIG. 12

PROVIDING A USER WITH VIRTUAL COMPUTING SERVICES

CLAIM OF PRIORITY

This application is a Continuation of U.S. patent application Ser. No. 13/476,980, which was filed on May 21, 2012, entitled "PROVIDING A USER WITH VIRTUAL COMPUTING SERVICES," which is a Continuation-in-Part (CIP) of U.S. patent application Ser. No. 12/782,660, which was filed on May 18, 2010 and issued as U.S. Pat. No. 8,185,581 on May 22, 2012, entitled "PROVIDING A LOCAL DEVICE WITH COMPUTING SERVICES FROM A REMOTE HOST," which application claims priority to U.S. Provisional Patent Application No. 61/179,636, which was filed on May 19, 2009, entitled "METHODS OF INTERACTION WITH A STREAMED VIRTUAL COMPUTER". This application is also a CIP of U.S. patent application Ser. No. 11/845,948, which was filed on Aug. 28, 2007, entitled "NETWORK-BASED COMPUTING ON A STREAMED VIRTUAL COMPUTER," which application claims priority to U.S. Provisional Patent Application No. 60/913,348, filed on Apr. 23, 2007, entitled "NETWORK-BASED COMPUTING ON A STREAMED VIRTUAL COMPUTER" and U.S. Provisional Patent Application No. 60/945,916, filed on Jun. 23, 2007, entitled "NETWORK-BASED COMPUTING ON A STREAMED VIRTUAL COMPUTER," all of which are incorporated herein by reference in their entirety.

BACKGROUND

Personal computing systems often require maintenance and protection from damage and can be lost, stolen or otherwise rendered inaccessible leading to lost productivity. One probable solution to the problem posed by a personal computing system is a networked computing system or environment. Such a system can maintain a virtual machine accessible from a network. However, a virtual computing system offers another set of challenges.

In regard to application use, a networked computing system can offer many applications that a user device does not have. However, when using the user device the user may not be aware of the various applications. Such a user may not use the applications even where the user has files that she cannot open.

In regard to file storage, such a networked computing environment can store files, but a user accessing the networked computing system may require file transfer between the networked computing system and the user device. For example, users may have some files on one computing system but need them on another computing system. Such transfers can be cumbersome, requiring the use of network file transfer programs and moderate technical knowledge regarding the directory layout of the networked computing system. These hurdles may impede the use of the network computing system.

In addition, sharing files or data from a personal computer to other users requires storing the data on magnetic discs or mobile storage devices (such as miniature USB hard drives) or emailing the attachments to the users. In many cases, carrying a separate storage drive or emailing data may be slow or cumbersome. Additionally, one may lose track of different versions of a document that has traveled from various users or computing devices. At times, application versions may vary between devices, causing the user to not be able to edit or work with a document at computers that do not support the document. Also, portable storage devices may become corrupted or unusable, creating further problems for a user.

For example, the user may create a document on his/her personal computer using a particular application (e.g., Corel WordPerfect). However, the user's work computer only contains a different application (e.g., Microsoft Word), and thus the user may not be able to work with the created document at both computers. Additionally, one computer may have a more current version of an application than another computer, and applications may become out of date or need heavy maintenance (updates, patches, and so on). Likewise, maintenance of the physical hardware of a computer is a laborious task which includes ensuring hardware is up-to-date to run new software and ensuring virus/malware scanners are kept up-to-date. Most users are not technically skilled to handle such maintenance.

Computer users today work from multiple computers, including home computers, work computers, laptop computers, internet cafes, airport kiosks, and so on. At times, travelers desire to avoid the need of carrying a laptop computer due to increased airport security measures and the possibility of theft or data loss or corruption. Internet café users and students working on shared computers in residence halls or libraries often are confronted with the problem of blocked access to removable storage devices. This prevents them from saving data from the shared computer onto their storage devices causing them to transfer their created data using undesirable methods, such as emailing attachments of their documents to themselves.

These and other problems exist with respect to meeting the needs of computer users.

BRIEF DESCRIPTION OF THE DRAWINGS

FIG. 12 depicts a screenshot of an example of a banner ad displayed in an information center.

DETAILED DESCRIPTION

Figure 1:
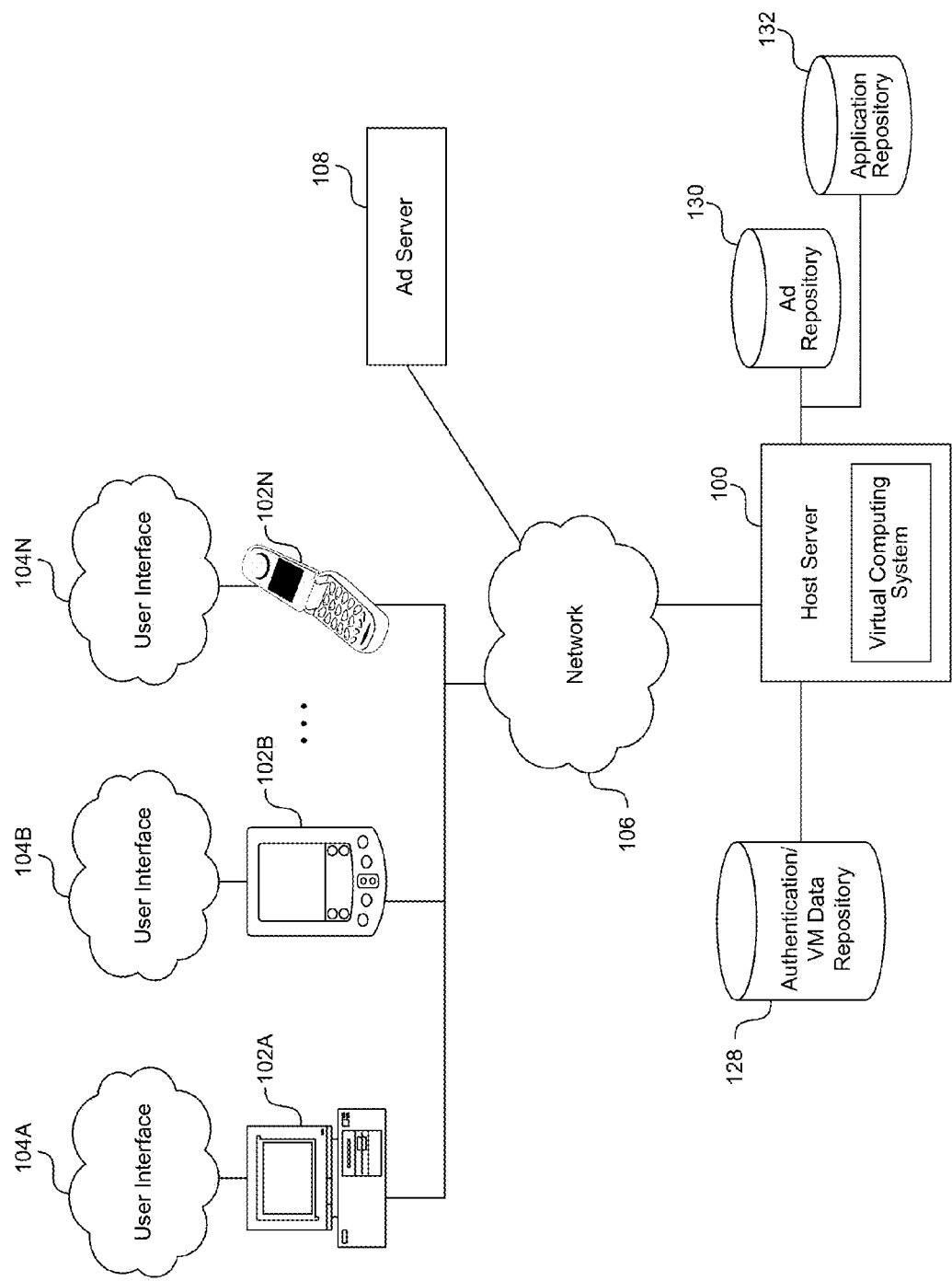
FIG. 1 illustrates a block diagram of client devices (local devices) and an ad server coupled to an example of a host server (remote server) that provides a virtual computing environment to the client devices through a network.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted by using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for the convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Embodiments of the present disclosure include systems and methods for providing a remote application and/or a virtual computing service that streams a desktop over the Internet to a remote user's internet connected device. The system enables users to run and on demand use software applications through the remote application and/or the virtual computing service. The system enables users to create, store, access, and/or edit data at any computing device using the remote application and/or the virtual computing service. Network-based (Internet based) computing, such as the systems and methods described herein, transfers data, applications, and processing power to a central grid of servers, often accessed via the Internet. In some embodiments, the central grid of servers may provide a remote application to a user's computing device over the Internet, such as via a streamed application presented to the user's computing device. In some embodiments, the central grid of servers creates a remote virtual computing service that streams data to user computing devices over the Internet, such as via a streamed desktop presented to a user's computing device. The central servers store user data created with streamed desktops and supply processing power for user computing devices. In some cases, the system manages operations of the user computing devices via the central virtual computing service. The user computing devices may not require high performance hardware, they may be old hardware, "thin-clients" or "dumb terminals" that have sufficient power and resources required to simply connect to the internet to access the virtual computing service (such as from a grid environment).

The virtual computing service may receive numerous data requests and undergo large processing demands. Thus, the virtual computing service may include several servers that are interconnected and optionally load balanced to form a "grid" of computing devices capable of handling such processing demands. These servers may be placed at various locations and controlled by a central grid that determines when and where to retrieve aspects of the virtual computing service when requested by a user device.

In some examples of the technology, the system provides some or all of the functionality described herein via simple web hosting. For example, the system establishes an account for a user and provides a unique URL to the user. The system creates a web publishing folder on a virtual desktop related to the user and located within the virtual computing service and links the web publishing folder with the unique URL. The system stores files or content received from the user into the web publishing folder. The user may access the files and content using the unique URL, and may also permit others to access the folder via the unique URL. Thus, the system provides a virtual desktop that may be accessed and/or shared by multiple users, enabling the sharing of content without the current drawbacks discussed herein.

In some examples of the technology, the system enables a user to access/open/read/edit a file stored on the user's computing devices via a central grid of servers by right-clicking the file. The file may be streamed or transferred from the user's computing devices to the central grid of servers. The central grid of servers is configured to allow the user to access/open/read/edit the file. The changes to the file or the entire updated file may be streamed or transferred back to the user's computing devices. In some implementations, the changes are synchronized automatically between the user's computing device and the central grid of servers. In some implementations, the user may initiate file synchronization by performing a drag-and-drop action of the file between the user's computing device and the central grid of servers.

In some examples of the technology, the system enables a user to access/open/read/edit a file stored on one or more remote storages via a central grid of servers by right-clicking the file. The file may be streamed or transferred from the one or more remote storages to the central grid of servers. The central grid of servers is configured to allow the user to access/open/read/edit the file. The changes to the file or the entire updated file may be streamed or transferred back to the one or more remote storages. In some implementations, the central grid of servers may be an online application provider.

In some examples of the technology, the system enables a user to access/open/read/edit data stored on the user's computing devices via a central grid of servers, in which the data is not openable, executable, editable, or accessible by applications installed on the user's computing devices. The central grid of servers may be configured to identify a remote application to open, execute, edit, and/or access the data, and determine whether to provide the remote application for use by the computing devices when the computing device is offline. When offline usage is not provided to the computing devices, portions of the remote application may be streamed to the user's computing devices used to open, execute, edit, and/or access the data. When offline usage is provided to the computing devices, the remote application in whole may be streamed to the user's computing devices used to open, execute, edit, and/or access the data.

In some examples of the technology, the system is configured to provide users a virtual desktop. The virtual desktop may comprise a plurality of existing running sessions. In some implementations, the running sessions are generic sessions of Windows running in the virtual desktop. When a user logs into the virtual desktop, the system may be configured to assign the user an existing running session in the virtual desktop. The user may open, execute, edit, and/or access the data in the assigned running session of the virtual desktop as if the running session originated from the user's devices. In some implementations, the changes to the data may be synchronized automatically between the virtual desktop, the user's devices, and/or one or more remote storages of the user. In some implementations, the user may initiate data synchronization by performing a drag-and-drop action of the data between the virtual desktop, the user's devices, and/or one or more remote storages.

In some implementations, the system may be configured to log off the user if the user remains idle in the assigned running session after a predetermined time period. After the assigned running session is logged off, it may be restored to a general running session to be ready for next user. Data from previous user is deleted and cleaned up from the running session. In some embodiments, the system may be configured to provide a grace period for the user. The assigned running session in the virtual desktop may be kept running for the user if the user gets disconnected and reconnected within the grace period. For example, the user may suffer momentary internet connection issues, or switch off user devices.

In some examples of the technology, the plurality of existing running sessions may be supported by a plurality of virtual servers. One or more of the plurality of virtual servers may be spun up and down to provide a dynamic datacenter without affecting existing running sessions. The plurality of virtual servers may be provided by a service provider. In some implementations, the plurality of virtual servers may be provided by a third party infrastructure.

In some examples of the technology, the system may be configured to provide a virtual desktop to a user through a browser (e.g., a browser using HTML5 or Flash) or a remote application installed on the user's devices. In some implementations, the user may open data through the web interface of the browser. The data may be stored in the user's devices and/or one or more remote storages. In some implementations, the one or more remote storages include, but not limited to, a third party storage, such as Dropbox®, Box.net®, and Google Drive® etc. In some implementations, the user may open data through a virtual desktop by launching the remote application installed on the user's devices. The virtual desktop may be configured to allow the user to access/open/read/edit data, in which the data is not openable, executable, editable, or accessible by applications installed on the user's devices In some examples of the technology, the system enables users to access virtual computing services via small or handheld computing devices, such as personal digital assistants, smart phones, tablets, etc., Mac/Window laptops, Linux machines, netbooks, cloudbooks, or any device having a browser and/or internet connection. In some cases, these devices act as simple connection or access devices and may contain ports that receive peripheral devices, such as power supply devices, monitors or other display devices, mice, keyboards, modems and other devices that provide a network such as the Internet. These devices may automatically connect the user to the virtual computing service, or may connect to the virtual computing service upon receiving a request from a user. Thus, the user devices provide the user with some or all of the software and functionality of a typical personal computer, without the drawbacks described herein.

In some examples of the technology, the system enables companies and other entities to provide advertisements and other content to users via the virtual computing service. For example, an advertiser may relate advertisements to a remote application streamed to the user, contents of documents created or accessed by the user, and/or user's characteristics, such as a user's location, the type of user (e.g., subscribers, free users, and so on), the time of user, the frequency of use, gender, age, interest, history, and so on. The system may present an advertising free environment to users that subscribe to certain services, and present advertisements to users that are not subscribers. The system may show a variety of advertising content, such as discreet pop-ups that fade in and fade out of a corner of the virtual desktop, wallpaper underlying the virtual desktop itself, advertising within the applications, and so on.

In some examples of the technology, the system enables users to save external data (such as data from his/her PC or laptop) directly to his/her virtual computing service and/or one or more remote storages. For example, the system may install a plug-in or other module to the user's computing device (e.g., to the operating system of the external device), which operates to push content from the external device to the virtual computing service and/or one or more remote storages. For example, the user may right-click a document and receive a save command (e.g., "send to virtual desktop" command) within a right-click menu within the operating system and related to the document. Thus, the system enables users to send and store files to the virtual computing service and/or one or more remote storages with minimal effort (e.g., a single click).

In some examples of the technology, the system provides a synchronization tool that monitors and synchronizes some or all changes made to files within specified folders in the virtual computer, one or more remote storages or with any offline devices (e.g., Laptops or Personal Computers). Thus, no matter how many times a user edits a file and no matter how many different locations he/she connects to the virtual computing service, the file will always appear to the user in its most current version on all his/her systems. To illustrate, a user may log in to his/her virtual computer from a public internet café in London and edit a document within the virtual computing service. By the time the user returns to the United States and logs in to his/her home computer, the edits to his document have already been synchronized and he/she may continue working on the document from its most recent version. Thus, regardless of location or device, the user will have access to the document in its most current form.

FIG. 1 illustrates a block diagram of client devices 102A-N and an ad server 108 coupled to an example of a host server 100 (remote server) that provides virtual computing to the client devices 102A-N through a network 106.

The client devices 102A-N can be any system and/or device, and/or any combination of devices/systems that is able to establish a connection with another device, a server and/or other systems. The client devices 102A-N typically include display or other output functionalities to present data exchanged between the devices to a user. For example, the client devices and content providers can be, but are not limited to, a server desktop, a desktop computer, a thin-client device, an Internet kiosk, a computer cluster, a mobile computing device such as a notebook, a laptop computer, a handheld computer, a mobile phone, a smart phone, a PDA, a Blackberry device, a Treo, an iPhone, etc. In one embodiment, the client devices 102A-N are coupled to a network 106. In some embodiments, the client devices may be directly connected to one another.

In one embodiment, the user devices 102 can interact with a virtual computing environment (e.g., a virtual computing environment provided by the virtual computing system hosted by the server 100). The virtual computing system in the server 100 can include one or more computing systems that host one or more virtual computing environments. Different user devices 102 may be assigned to different virtual environments. Access to the virtual environments may be user-specific and/or device specific. In some instances, users or devices use accounts to access a virtual computing environment which may be user-customized or device-customized.

The user devices 102 can interact with a virtual computing environment that is hosted remotely to access computing services including but not limited to, remote storage, backup, and/or synchronization services. In addition, user devices 102 can access software/applications available in the virtual computing environment. For example, a user device 102 may use software/applications installed remotely in the virtual computing environment on a remote host to access/open/read/edit content (e.g., streamed content) or files locally stored.

The locally stored content/files can be sent in part or in whole to the virtual computing environment for access by the remote application. Alternatively, the remote application can be streamed and/or cached in part and/or downloaded in whole by the user device 102 such that the content/file can be executed or otherwise accessed on the user device 102.

The network 106, over which the client devices 102A-N may be a telephonic network, an open network, such as the Internet, or a private network, such as an intranet and/or the extranet. For example, the Internet can provide file transfer, remote log in, email, news, RSS, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices, host server, and may appear as one or more networks to the serviced systems and devices. In one embodiment, communications to and from the client devices 102A-N can be achieved by, an open network, such as the Internet, or a private network, such as an intranet and/or the extranet. In one embodiment, communications can be achieved by a secure communications protocol, such as secure sockets layer (SSL), or transport layer security (TLS).

The term "Internet" as used herein refers to a network of networks that uses certain protocols, such as the TCP/IP protocol and possibly other protocols such as the hypertext transfer protocol (HTTP) for hypertext markup language (HTML) documents that make up the World Wide Web (the web). Content is often provided by content servers, which are referred to as being "on" the Internet. A web server, which is one type of content server, is typically at least one computer system which operates as a server computer system and is configured to operate with the protocols of the World Wide Web and is coupled to the Internet. The physical connections of the Internet and the protocols and communication procedures of the Internet and the web are well known to those of skill in the relevant art. For illustrative purposes, it is assumed the network 106 broadly includes anything from a minimalist coupling of the components illustrated in the example of FIG. 1, to every component of the Internet and networks coupled to the Internet.

In addition, communications can be achieved via one or more wireless networks, such as, but is not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The client devices 102A-N can be coupled to the network (e.g., Internet) via a dial up connection, a digital subscriber loop (DSL, ADSL), cable modem, and/or other types of connection. Thus, the client devices 102A-N can communicate with remote servers (e.g., web server, host server, mail server, and instant messaging server) that provide access to user interfaces of the World Wide Web via a web browser, for example.

The authentication/VM data repository 128, ad repository 130, and application repository 132 can store software, descriptive data, images, system information, drivers, and/or any other data item utilized by parts of the host server 100 for operation. The repositories may also store user information and user content, such as, user profile information, user preferences, content information, network information, etc. The repositories may be managed by a database management system (DBMS), for example but not limited to, Oracle, DB2, Microsoft Access, Microsoft SQL Server, PostgreSQL, MySQL, FileMaker, etc. The ad repository 130 may additionally store advertisements and the application repository 132 may store software programs/applications executable by the host server 100 in one or more virtual computing environments or remotely accessible by a user device 102. In some implementations, the ad repository 130 may be, not limited to, a third party service provided by an established advertisement network.

The repositories can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package. In addition, the host server 100 is able to retrieve data from the authentication/VM data repository 128, ad repository 130, and/or application repository 132.

Figure 9:
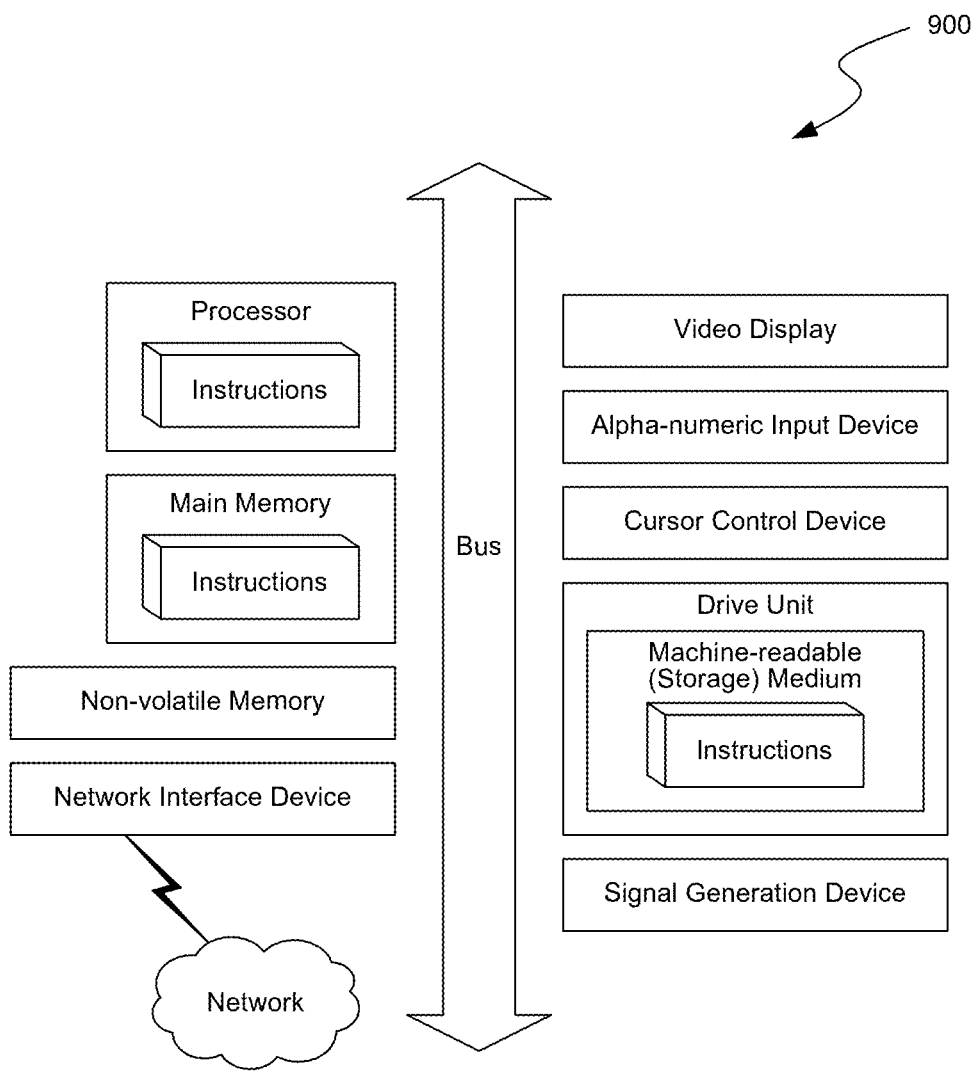
FIG. 9 shows a diagrammatic representation of a machine in the example form of a computer system within which a set of instructions, for causing the machine to perform any one or more of the methodologies discussed herein, may be executed.

The host server 100 can be implemented on a known or convenient computer system, such as is illustrated in FIG. 9. The host server 100 is described in more detail with reference to FIG. 2.

Figure 2:
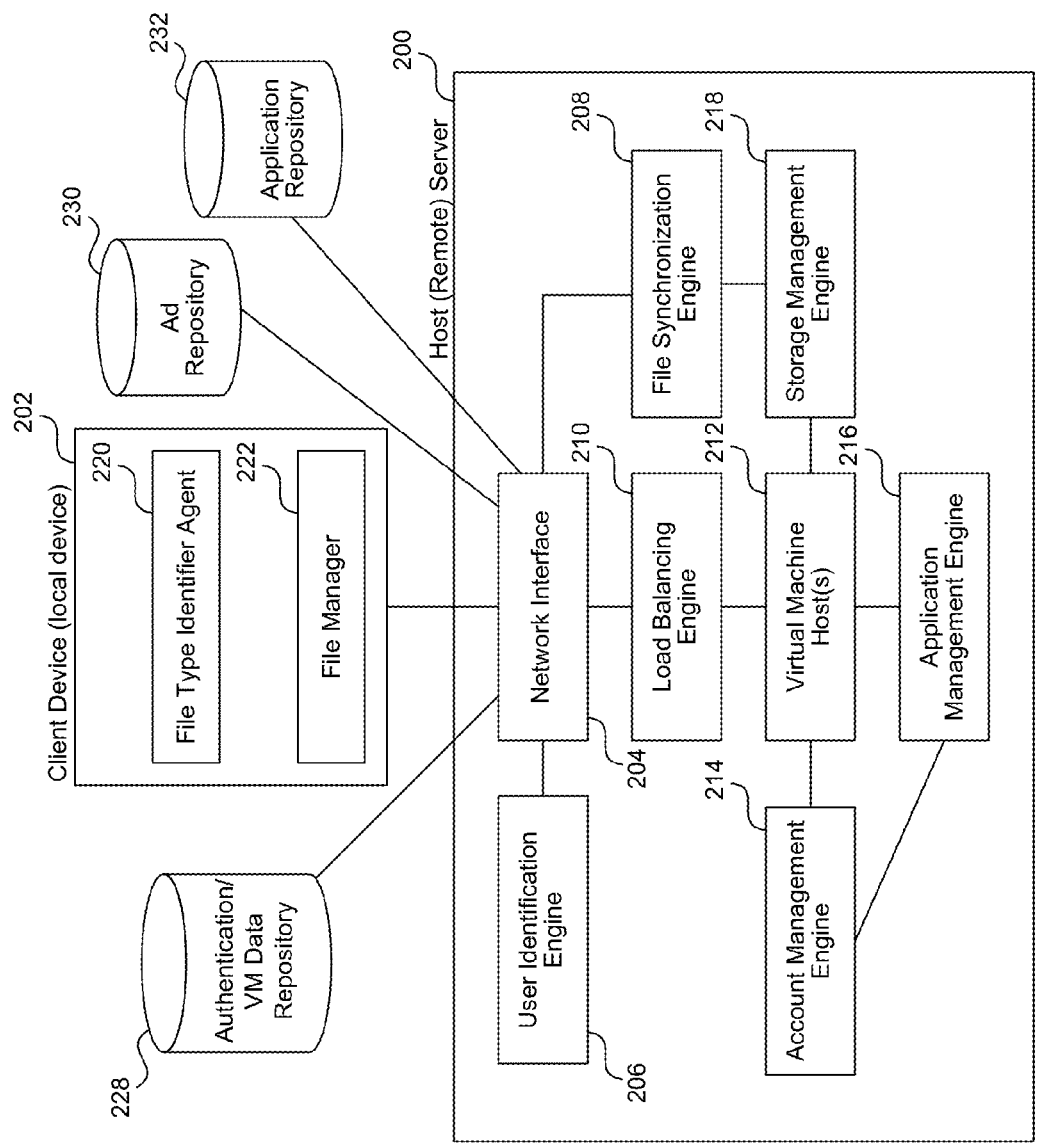
FIG. 2 depicts a block diagram illustrating an example of a host server (remote server) that provides a client device (local device) with computing services.

FIG. 2 depicts a block diagram illustrating an example of a host server 200 that provides a client device (local device) 202 with computing services.

The host server 200 can include an authentication/VM repository 228, an ad repository 230, and/or the application repository 232. The host server 200 may be communicatively coupled to the authentication/VM repository 228 the ad repository 230, and/or the application repository 232 as illustrated in FIG. 2. In some embodiments, the authentication/VM repository 228, the ad repository 230, and/or the application repository 232 are partially or wholly internal to the host server 200.

In the example of FIG. 2, the host server 200 includes a network interface 204, a user ID engine 206, a file synchronization engine 208, a load balancing engine 210, a virtual machine host 212, an application management engine 216, and/or a storage management engine 218. Note that each component of the host server 200 can reside on a different block or grid.

As used in this paper, an "engine" includes a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The host server 200 may be coupled to a client device (local device) 202 such as the client device 102 in the example of FIG. 1. The client device 202 can include a file type identifier agent 220 and/or a file manager 222. The agent 220 and/or the manager 222 may be locally installed on the client device 202 or streamed/downloaded from the host server 200, for example, upon account registration or on demand.

In the example of FIG. 2, the network controller 204 can be one or more networking devices that enable the host server 200 to mediate data in a network with an entity that is external to the host server, through any known and/or convenient communications protocol supported by the host and the external entity. The network controller 202 can include one or more of the following: a network adaptor card, a wireless network interface card, a router, an access point, a wireless router, a switch, a multilayer switch, a protocol converter, a gateway, a bridge, bridge router, a hub, a digital media receiver, and/or a repeater.

A firewall, can, in some embodiments, be included to govern and/or manage permission to access/proxy data in a computer network and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand.

Other network security functions can be performed or included in the functions of the firewall. These can be, for example, but are not limited to: intrusion-prevention, intrusion detection, next-generation firewall, personal firewall, etc., without deviating from the novel art of this disclosure. In some embodiments, the functionalities of the network interface 202 and the firewall are partially or wholly combined and the functions of which can be implemented in any combination of software and/or hardware, in part or in whole.

One embodiment of the host server 200 includes a user ID engine 206. The user ID engine 206 can be implemented, for example, as software embodied in a computer-readable medium or computer-readable storage medium on a machine, in firmware, in hardware, in a combination thereof, or in any applicable known or convenient device or system. This and other engines described in this specification are intended to include any machine, manufacture, or composition of matter capable of carrying out at least some of the functionality described implicitly, explicitly, or inherently in this specification, and/or carrying out equivalent functionality.

The user ID engine 206 can be any combination of hardware components and/or software agents able to identify a user and/or client device to manage access to virtual machines, remote storage, applications, etc.

The user ID engine 206 can create an account for a user and/or a client device for accessing a virtual machine. The user can use the account credentials to login and access a virtual machine where his/her content/files are stored. For example, the user ID engine 206 may receives a request from a user or client device to access the network, validates authentication credentials, and allows the user device to transmit and receive data through the network interface 204; alternatively the user ID engine 206 receives the authentication credentials, finds the credentials invalid, and refuses admission to the network.

One embodiment of the host server 200 includes the authentication/VM data repository 228. In the example of FIG. 2, the authentication/VM data repository 228 can be implemented, for example, as software embodied in a computer-readable medium or computer-readable storage medium on a machine, in firmware, in hardware, in a combination thereof, or in any applicable known or convenient device or system.

This and other repositories such as databases described in this specification are intended to include any organization of data, including tables, comma-separated values (CSV) files, traditional databases (e.g., MYSQL), or other applicable known or convenient organizational formats. Some repositories/databases may require database interfaces, which are assumed to be incorporated in the database or the component coupled to the database in this and other figures, if applicable.

In one embodiment, the repository 228 can be used to store access credentials, authorization information, and/or account information of users and/or client devices. As used herein, "authorization information" is interpreted to mean a username and password, keys defined under a scheme such as public-key cryptography, or another known or convenient form of access control. The access credentials can be used by the user ID engine 206 to determine whether a user can access a specific virtual machine. The credentials can also be used by the user ID engine 206 to identify the content, files, and/or storage directories to which the user has access to and the type of access (e.g., read, write, delete, etc.). In one embodiment, the access credentials can be used by the engine 206 to determine the software programs and/or applications to which the user or client device has access to (e.g., subscription, purchase, rental, etc.).

In addition, privacy attributes of content stored in the remote storage on the host server 200 can also be stored in the repository 208. The storage can be included in a single mass storage device, plurality of mass storage devices, storage managed by a storage controller, or any known or convenient storage device. The storage need not be local to a computing system performing the storage, and can be accessible over a network. For example, storage could be a disk coupled to the virtual computing system, a partition on a volume derived from a RAID (redundant array of independent disks), or any other known or convenient storage system. The storage can be public, private, or otherwise designated.

As used herein, "public" access is defined as storage any user can access. Read and write permission can be specified, or not, as is desirable. For example, a user can set up public storage to allow read only access, read and write access, or another known or convenient set of permissions. As used herein, "private" access is defined to include access to only those individuals specified as having permission to access the "private" storage. An individual user can designate "buddies," or other users of the virtual computing system as having access to the private storage of the user. For example, a user, "Jane," can list "Joe," "David," and "Lisa" as having private access, a system can automatically create a list of buddies associated with the user, or any known or convenient manner of assigning private access can be used. In one embodiment, vanity URLs can be used for logging into a user's account to access the storage.

The authentication/VM data repository 228 can further store virtual machine data, data files, the virtual machines themselves, and data/system files for instantiating virtual machines. For example, the authentication/VM data repository 228 can store a file including data and instructions executed by a virtual machine host to produce a virtual machine. Additional, the authentication/VM data repository 228 can store user data generated by a user of the virtual machine.

One embodiment of the host server 200 includes a load balancing engine 210. The load balancing engine 210 can be implemented, for example, as software embodied in a computer-readable medium or computer-readable storage medium on a machine, in firmware, in hardware, in a combination thereof, or in any applicable known or convenient device or system.

The load balancing engine 210 can be any combination of hardware components and/or software agents able to balance the resource demands among various virtual machine hosts 212 in the host server 200.

For example, assume there are 2 virtual machine hosts; 10 users might transmit 10 requests for 10 virtual machines. The load balancing engine 210 can re-distribute the requests among the 2 virtual machine hosts so that each of the virtual machine hosts receives five of the 10 requests. Alternatively, the load balancing engine 210 can redistribute the requests unequally, such as where the virtual machine hosts have unequal resources. Suppose there are two virtual machine hosts and one of the hosts has twice the resources as the other. The load balancing engine can re-distribute the load so that ⅔ of the requests are distributed to one machine and ⅓ of the requests are distributed to the other machine. Further, and in another alternative, the load balancing engine 210 could redistribute the load according to any known or convenient load balancing scheme.

In one embodiment, the load balancing engine 210 can determine the number and types of requests to access a virtual machine. In addition, the engine 210 may further identify the needed resource intensity of the requests. Based on the number of requests and the predicted resource intensity, the engine 210 can assign the request to the virtual machine hosts 212 to ensure that the load is relatively balanced among the hosts 212 to enhance or improve performance and/or user experience.

In the example of FIG. 2, the virtual machine hosts 212 can include individualized hardware units executing instructions supporting one or more virtual computing environments (e.g., virtual machines). Each of the virtual machine hosts 212 can have a processor and memory, as well as a network interface for transmitting and receiving data for the virtual machines.

The virtual machine hosts 212 can include any number of hardware units or computers. For example, the virtual machine hosts 212 can include; rack-mount computing servers, desktop machines, shared resource computing systems, clustered computers, distinct computing systems operating on a single hardware unit or any known or convenient computing systems, or any combination of thereof.

For example, one embodiment of the host server 200 includes an account management engine 214. The account management engine 214 can be implemented, for example, as software embodied in a computer-readable medium or computer-readable storage medium on a machine, in firmware, in hardware, in a combination thereof, or in any applicable known or convenient device or system.

The account management engine 214 can be any combination of hardware components and/or software agents able to manage billing, transactions, and advertising related matters.

For example, when an application or software program stored in the virtual machine hosts 212 is requested by a user or client device 202, the engine 214 can determine whether a fee is to be assessed. The fee that is assessed can depend on a service model that the requesting user or client device 202 is subscribed to. Multiple types of service models can be provided to users for accessing the virtual machine hosts 212 and the services that are thus provided.

Any number of service models can be provided. For example, a user can sign up for a one time subscription service where a fixed fee is due upon signing or prior to initial use. The fixed fee can allow the user to access any amount of storage and/or use any number of software programs/applications on the virtual machine hosts 212.

Alternatively, a user can sign up for a pay per use type model. For example, a user can pay a fee for each hour the client device 202 is connected to the virtual machines 212. Various tiers of fee structures can be provided to allow users more or less storage space. In addition, various tiers of fee structures can be provided to govern application access. For example, a higher fee may be assessed for access to more applications and/or for a longer period of time.

In general, the user/client device 202 can select a service model to access software on a per use basis, to rent it for a period of time, or to purchase it such that it is always available. In addition, a user can typically select a service model/fee structure such that a software program is only available for access when the client device 202 is online (e.g., connected to a network) or also when the client device 202 is offline (e.g., disconnected from a network) as well.

Based on the applicable service model/fee structure, the account management engine 214 can handle payments. In one embodiment, the engine 214 determines the amount due from a user and when the due date/time is, for example, based on the user or user device's request to access the virtual machine hosts 212. The engine 214 can receive, process, and validate payment information and credit the payment to the user's account.

When a request to access a software program is received, the engine 214 can identify the relevant service model/fee structure, which may be selected by a user or applicable by default. For example, the engine 214 can determine the amount of fee to assess based on whether the user wishes to rent or purchase the application. Additionally, the engine 214 can assess the fee based on the length of the rental. In some instances, free trials are granted to select or first time users.

In certain examples of service models, access of advertisements can be an option in waiving some or all of the fees otherwise due for access of the virtual machine hosts 212. For example, access of a predetermined number of ads by a user or via a client device 202 may allow the user to access the virtual machines 212 or the applications/software programs stored thereon free of charge for a certain amount of time.

As used herein "rental" of software refers to a transaction between a user and a virtual computing system in which a software application is executed on a virtual machine host for an agreed upon duration of a time. For example, a user can "rent" a file conversion program for a single use, such as to open a file in an uncommon format. Alternatively, a user can rent a graphics editing program for a month at a specified fee; the graphics program could be executed on a virtual machine host on behalf of the user who remotely uses the program as needed. Further, any known or convenient application could be rented. Upon termination of the rental agreement, the rented program can cease to respond to user requests to use the program. However, the termination of an agreement to rent a particular software application need not terminate a user's ability to execute other programs on the virtual host machine.

As used herein, "advertising" or an "ad" refers to any promotional content provided in the interest of persuading the purchase of products or services, the donation of money, the patronage of an event, promotion of an idea/concept, the performance of an act or another known or convenient purpose. "Advertising" can, but need not be for profit.

One embodiment of the host server 200 further includes an application management engine 216. The application management engine 216 can be implemented, for example, as software embodied in a computer-readable medium or computer-readable storage medium on a machine, in firmware, in hardware, in a combination thereof, or in any applicable known or convenient device or system.

The application management engine 216 can be any combination of hardware components and/or software agents able to control, select, determine, launch, deploy, and/or terminate the applications/software programs that execute on the virtual machine hosts 212.

In one embodiment, the engine 216 retrieves software programs/applications from the storage in the host server 200 and provides the retrieved software to one or more virtual machine hosts. Software/application retrieval (e.g., streamed, downloaded, or cached) can be performed in response to a request received from the client device 202, for example. The client device 202 can generate the request when a locally-stored file requires access by an application that is not locally installed on the client device 202.

In one embodiment, the account management engine 214 controls whether the application management engine 216 is allowed to provide a certain software program/application to the virtual machine hosts 212 for execution based on whether the requisite fees have been paid by the requestor.

In some instances, the client device 202 has a file type identifier agent 220. The file type identifier agent 220 can be implemented, for example, as software embodied in a computer-readable medium or computer-readable storage medium on a machine, in firmware, in hardware, in a combination thereof, or in any applicable known or convenient device or system.

In general, the file type identifier agent 220 can be any combination of hardware components and/or software agents able to identify or detect file types of data or files on a device. In one embodiment, the agent 220 can identify one or more file types of files stored on the client device 202 which are not associated with a local application that is installed on the client device 202. For example, file extension mapping can be performed to determine whether the data is accessible by the applications that are installed on the client device 202.

In some instances, the client device 202 has a file manager 222. The file manager 222 can be implemented, for example, as software embodied in a computer-readable medium or computer-readable storage medium on a machine, in firmware, in hardware, in a combination thereof, or in any applicable known or convenient device or system.

In general, the file manager 222 can be any combination of hardware components and/or software agents able to detect a request to access content, files, directories on a device. In one embodiment, the file manager 222 is coupled to the agent 220 and can detect a request to access a file stored on the local device having one of the one or more file types not accessible by a locally installed application/software program. Upon detecting such a request, the file manager 222 can establish a communication with the host server 200 to request to access a remote application to access the local file. The remote application can be streamed.

One embodiment of the host server 200 further includes a file synchronization engine 208. The file synchronization engine 208 can be implemented, for example, as software embodied in a computer-readable medium or computer-readable storage medium on a machine, in firmware, in hardware, in a combination thereof, or in any applicable known or convenient device or system.

In general, the file synchronization engine 208 can be any combination of hardware components and/or software agents able to synchronize, store, update, modify, and/or delete content, files, and/or directories between two storage devices.

For example, the engine 208 can synchronize (e.g., copy, transmit, send, upload, store, etc.) content stored on the client device 202 on the remote storage of the host server 200. The content may be associated with a local directory on the client device and synchronized with a remote directory on the remote storage device. The content can be streamed, downloaded, or cached. The content stored on the remote storage is typically associated with a user or client device and can have associated privacy settings. For example, the user can allow certain other users to have access rights to content in the remote directory.

Different directories or different files can have different privacy settings. For example, certain directories/files may be viewed/read by other users whereas other directories/files may be modified/deleted by other users. In some instances the remote directory can be accessed by the user using a URL. For example, a user can specify name.niv.io, name.domain.topleveldomain (e.g., vanity URLs), or another known or convenient format. The URL can be created as a domain, sub-domain, or other known or convenient resource access device. Transfers can be effected using a URL. For example, a user specifies a copy operation from the user's machine to jane.niv.io, and the files are transmitted over a network to storage associated with a user "Jane." Alternatively, a program automatically executes a read operation from public storage at location "publicmaterials.Lisa.domain.topleveldomain." Additionally, a transfer involving a URL can be affected in any known or convenient manner.

In general, if a user uses multiple devices (e.g., a laptop, a smart phone, a desktop), content on each of the multiple devices can be synchronized on the remote storage on the host server 200 such that the user can access content stored on different devices through a single device when connected to the host server 200.

In one embodiment, a user can initiate content synchronization by performing a drag-and-drop action of the target content/file between the source and target directories. The source directory may be a local directory on the client device 202 and the target directory can be the remote directory on the host server 200. Alternatively, the drag and drop action can be performed from a local file to a virtual drive representing the remote storage associated with the remote host or from a virtual folder representing the remote storage associated with the remote host. In one embodiment, the content is converted to HTML upon transmission from the local device to the remote storage associated with the remote host.

To synchronize content between different locations, the file synchronization engine 208 can identify differences between data stored on the client device 202 and the virtual machine 212 on the host server (remote server) 200. The file synchronization engine 208 can copy data to and from the client device 202 to bring into line any differences between the data.

For example, a user device could have a folder specified as a synchronization folder which is regularly compared with a folder in virtual machine storage on the host 200 and updated to reflect differences. Alternatively, the entire storage space on the client device 202 could be synchronized with a storage location in storage associated with the virtual machine.

Files can be present in one directory but not the other; and data may have been added or deleted. The files can be transferred to the virtual machine, and where separate storage is used, the files can be transferred to storage directly. For example, a user can prepare a file, document or other data storage device on a personal digital assistant (PDA) and save the file to storage local to the PDA. The storage local to the PDA can be synchronized with storage associated with a virtual machine. Alternatively, the file can be saved to storage on a storage server associated with a personal computing device, and synchronized with storage coupled to the virtual machine. Further any known or convenient storage devices can be synchronized.

Differences in files can be specified in changes to blocks of data making up the files, by changes to the contents of the files, or another known or convenient manner of identifying differences. For example, where a file has been edited the differences can include both deletions and additions. These changes can be captured and transmitted for addition and deletion from files in a directory to be synchronized. Synchronization can be completed by any known and convenient protocol. For example, the files could be transferred by FTP (file transfer protocol), iSCSI (internet small computer systems interface), or any other known or convenient manner of transferring files. Directories can be synchronized at any convenient time. A manually selected time can be used, or an automatically designated time can be used. For example, synchronization can be executed every 20 minutes, a user can instruct a user device to initiate synchronization, or another manner of synchronization can be selected. In some implementations, synchronization may be triggered through "hooks" that detect real time changes in the file.

Synchronization rules can be applied to determine whether to copy data to or from the client device 202, and whether to delete data from the client device and/or the virtual machine host 212 on the host server 200. For example, a rule for storage associated with a virtual machine 212 can be implemented to cause the storage associated with the virtual machine to reflect changes in storage associated with a user device, but not to allow changes to storage associated with the virtual machine to be reflected in storage associated with the user device. Alternatively, changes in virtual machine 212 storage could be reflected in the client device 202 storage. Further, any changes can be reflected in either or both of the client device storage and the virtual machine storage.

One embodiment of the host server 200 further includes a storage management engine 218. The storage management engine 218 can be implemented, for example, as software embodied in a computer-readable medium or computer-readable storage medium on a machine, in firmware, in hardware, in a combination thereof, or in any applicable known or convenient device or system.

In general, the storage management engine 218 can be any combination of hardware components and/or software agents able to control the access (e.g., read write, delete, update, modification, etc.) of content, files and/or directories stored on storage in the host server 200.

The storage management engine 218 can perform read and/or write operations on behalf of a virtual machine hosts 212 and/or the file synchronization engine 208. The storage management engine 218 can also manage physical disks. For example, the storage management engine 218 can be coupled to a storage controller (not shown) for access to a logical partition of a group of disks. Alternatively, the storage management engine 218 can directly access physical storage and perform read and write operations.

One embodiment of the host server 200 includes the ad (advertisement) repository 230. In the example of FIG. 2, the ad (advertisement) repository 230 can be implemented, for example, as software embodied in a computer-readable medium or computer-readable storage medium on a machine, in firmware, in hardware, in a combination thereof, or in any applicable known or convenient device or system.

The ads (advertisements) repository 230 can store ads and or advertisement account information as well as any information related to the advertisements. For example, the advertisements repository 230 can store images such as banner ads for delivery to a user during use of a virtual machine. Additionally, cost and pricing information charged to an advertiser can be stored.

One embodiment of the host server 200 includes the application repository 232. In the example of FIG. 2, the application repository 232 can be implemented, for example, as software embodied in a computer-readable medium or computer-readable storage medium on a machine, in firmware, in hardware, in a combination thereof, or in any applicable known or convenient device or system.

The apps repository 232 can be a repository of application executable files, libraries, supporting documentation, and other 232 or convenient application data. For example, the apps repository 232 can store a game and supplemental levels. Additionally, the apps repository 232 could store software manuals explaining the user of, e.g. video editing software.

Figure 3:
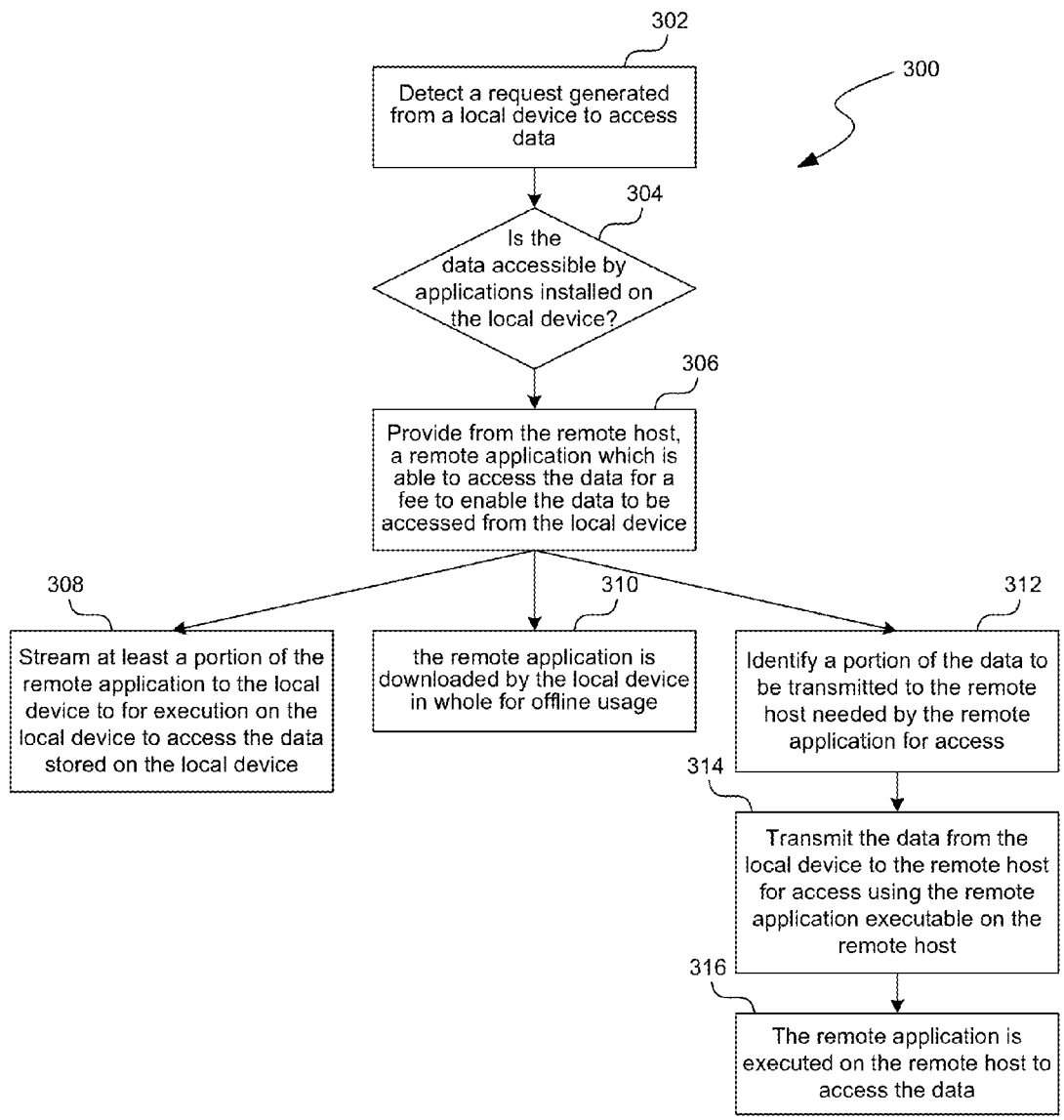
FIG. 3 depicts a flowchart of an example process of a remote host providing a local device with a remote application to access data that is otherwise not accessible by applications installed on the local device.

FIG. 3 depicts a flowchart of an example process of a remote host providing a local device with a remote application to access data that is otherwise not accessible by applications installed on the local device.

The method is organized as a sequence of processes in the flowchart 300. However, it should be understood that these processes and processes associated with other methods described herein may be reordered for parallel execution or into different sequences of processes.

In process 302, a request generated from a local device (e.g., the client device 202 in the example of FIG. 2) to access data is detected. The request can be generated in response to a user or application's attempt to open, view, edit, modify, or otherwise access content, data, or file on the local device.

In process 304, it is determined whether the data is accessible by applications installed on the local device. In one embodiment, an agent executing on the local device can perform file extension mapping on locally stored files/data and identify each one without locally compatible application/software program. The agent can be running continuously, periodically, or launched when a file access request is detected.

If not, in process 306, a remote application which is able to access the data for a fee to enable the data to be accessed from the local device is provided from the remote host (e.g., host server 200 in the example of FIG. 2). Depending on the applicable service model/fee structure, the remote application can be provided with or without requiring a fee. For example, fee can enable access to the remote application for a predetermined amount of time. Alternatively, the fee for access of the remote application can be waived if a predetermined number of advertisements displayed on the local device have been accessed.

In general, many options exist for using the remote application to access data on the local device. Such options may be determined at least in part by the applicable service model/fee structure, which may be selected by the user or set by default either by the local device or remote host. For example, the remote application can execute on the local device or on the remote host to access the data/file.

In process 308, at least a portion of the remote application is streamed to the local device for execution on the local device to access the data stored on the local device. For example, the local data remains on the local device and the remote host streams the portions of the application needed to open/execute the local data to the local device such that the data/file can be locally executed. In process 310, the remote application is downloaded by the local device in whole. When the remote application is downloaded to the local device in whole, the application can be available for offline usage, for example, for a predetermined period of rental time. The rental time may be days, weeks, or months depending on, for example, the rental fee. The rental is typically renewable.

Alternatively, the data/file can be opened/executed on the remote host and the data/file can be stored on the remote storage of the remote host. For example, in process 312, a portion of the data to be transmitted to the remote host needed by the remote application for access is identified. In process 314, the data from the local device is transmitted to the remote host for access using the remote application executable on the remote host. In process 316, the remote application is executed on the remote host to access the data. In one embodiment, images of the remote application are transmitted to the local device for display on the local device depicting results of accessing the data. In addition, data modified by the remote application on the remote host is transmitted to the local device.

Figure 4:
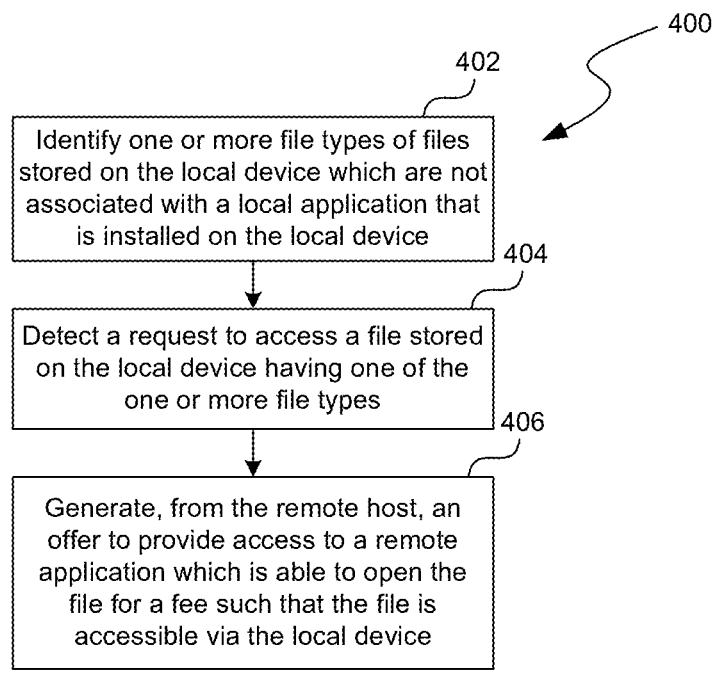
FIG. 4 depicts a flowchart of another example process of a remote host providing a local device with a remote application to access data that is otherwise not accessible by applications installed on the local device.

FIG. 4 depicts a flowchart of another example process of a remote host providing a local device with a remote application to access data that is otherwise not accessible by applications installed on the local device.

The method is organized as a sequence of processes in the flowchart 400. However, it should be understood that these processes and processes associated with other methods described herein may be reordered for parallel execution or into different sequences of processes.

In process 402, one or more file types of files stored on the local device which are not associated with a local application installed on the local device are identified. The one or more file types can be identified by performing file extension mapping or other methods. In some implementations, the one or more file types can be identified by user's selection of a virtual computing service provided by a service provider, such as "open with nivio."

In process 404, a request to access a file stored on the local device having one of the one or more file types is detected. In process 406, an offer to provide access to a remote application which is able to open the file for a fee such that the file is accessible via the local device is generated from the remote host. The offer can include multiple services models selectable by a user of the local device. In one embodiment, a selected service model determines the fee and whether the remote application is provided for use by the local device when offline. The fee may determine the amount of time the remote application is available on the local device for offline usage.

In one embodiment, the remote application is transmitted in whole to the local device for execution on the local device when the selected service model provides for offline usage by the local device. In another embodiment, portions of the remote application are streamed to the local device used for execution to open the file when the selected service model does not provide for offline usage by the local device.

Figure 5:
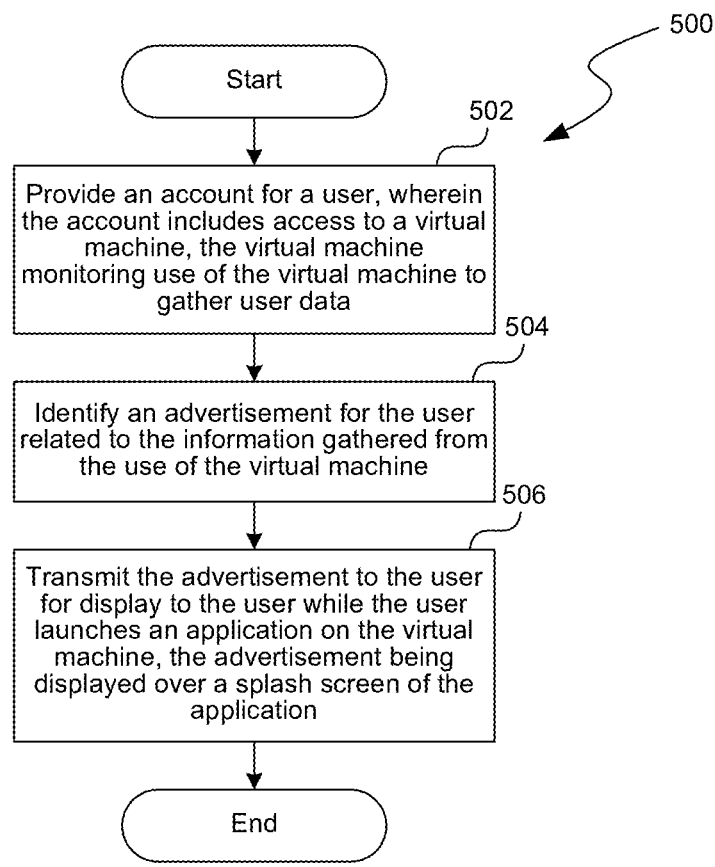
FIG. 5 depicts a flowchart of an example for targeting advertising to a user using a virtual machine hosted by a remote server.

FIG. 5 depicts a flowchart of an example for targeting advertising to a user using a virtual machine hosted by a remote server.

The method is organized as a sequence of processes in the flowchart 500. However, it should be understood that these processes and processes associated with other methods described herein may be reordered for parallel execution or into different sequences of processes.

The flowchart 500 starts at process 502 with providing an account for a user, wherein the account includes access to a virtual machine. In some embodiments, the virtual machine may comprise a plurality of existing running sessions. In some implementations, the existing running sessions are generic sessions of Windows running in the virtual machine. When the user logs onto a service provider of the virtual machine, the user may be assigned with an existing running session in the virtual machine, along with access credentials and storage. The existing running session may be configured to monitor the user's activities in the running session to gather user data. In some implementations, a virtual machine can be created on a shared system, an individual computing system, or in another known or convenient manner. The storage may or may not be commonly shared with storage for the virtual machine.

The flowchart 500 continues to process 504 with identifying an advertisement for the user related to the information gathered from the use of the running session in the virtual machine. In using a virtual environment, a user can generate useful data that describes the user's habits. For example, time of use, duration, programs used, websites visited, content generated, age, race, products purchased, culture, and other known or convenient data points. These data points can be collected and advertising can be targeted to the user's data points. For example, a teen age user who is using the running session for music related purposes can be offered concert tickets, a graphic designer who regularly uses the machine between 2 and 4 am can be offered coffee, and any other known or convenient offers can be created based on the nature of the user's use.

In the example of FIG. 5, the flowchart 500 continues to process 506 with transmitting the advertisement to the user for display as a splash screen of the application to the user while the user launches an application on a running session in the virtual machine. The advertising is relatively unrestricted because of the control that can be exercised over the running session. For example, as the memory of a running session is directly accessible on the virtual machine host, the advertisement can be added by the virtual machine host at the instruction of an account management engine. Alternatively, a user can receive the advertising as a part of messages received when logging into a running session of the virtual machine. Further, any known or convenient manner of advertising can be used. Having transmitted advertising, the flowchart terminates.

Figure 6:
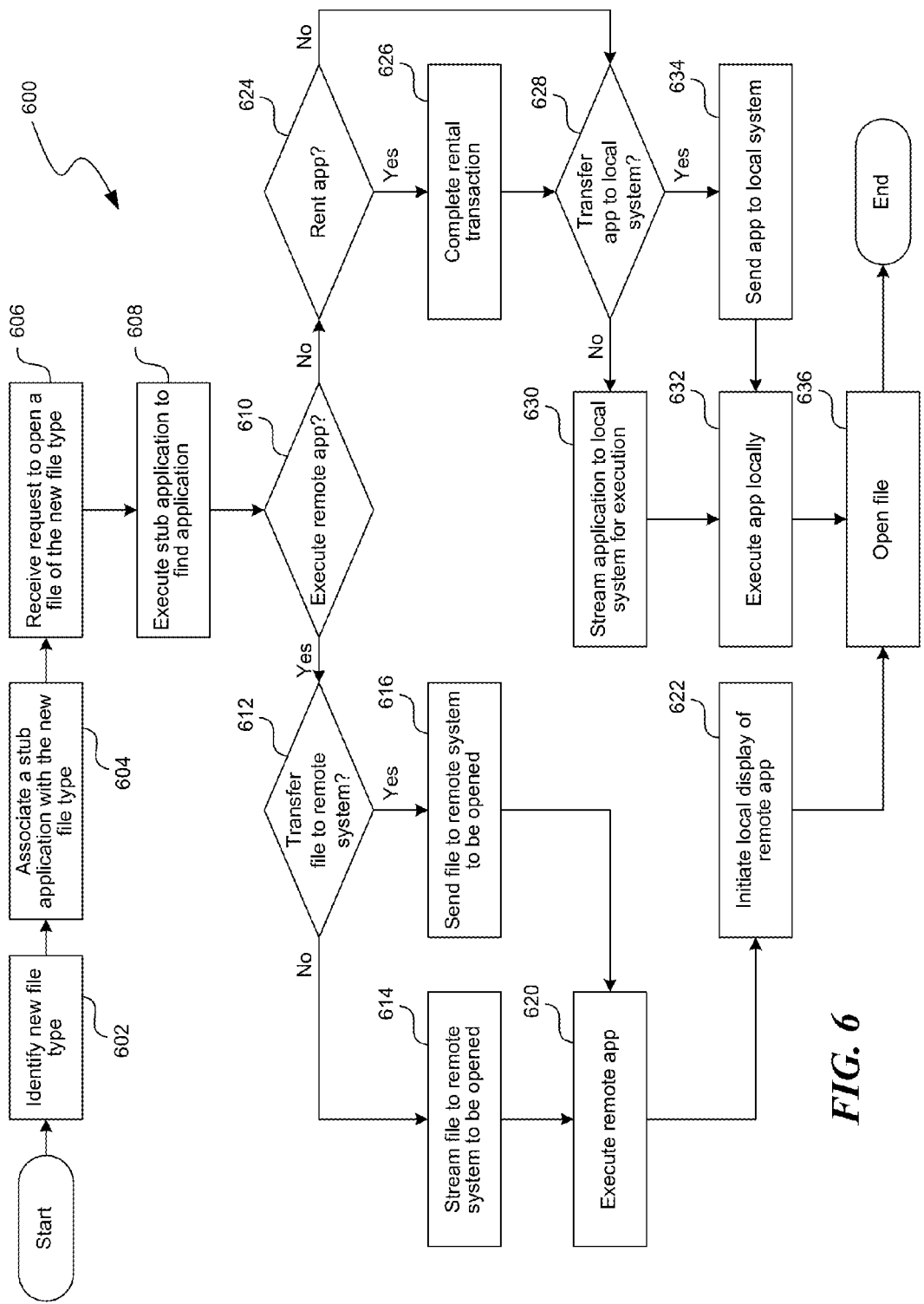
FIG. 6 depicts a flowchart of an example process for opening a file using a remote application/software program provided by a remote host.

FIG. 6 depicts a flowchart of an example process for opening a file using a remote application/software program provided by a remote host.

The method is organized as a sequence of processes in the flowchart 600. However, it should be understood that these processes and process associated with other methods described herein may be reordered for parallel execution or into different sequences of processes.

In the example of FIG. 6, the flowchart starts at process 602 with identifying a new file type. In a computing system having file types, the file type associates a file of the file type with an application for opening the file. Typically, more than one program can be capable of opening the file, however, one program is chosen as the program to open the file. Where no program is selected as the program for opening files of the file type, the computing system may not be able to open that file.

A new file type can be created, entered, or otherwise defined in a computing system. Some systems may recognize a new creator type, application type, file extension, or other file type by the creation or copying of a file to the computing system. For example, a user can register a new file type in a system file types registry. Alternatively, a user could copy a file to the computing system from another computing system. Further, a new file type may be otherwise identified as is known or convenient.

The flowchart continues to process 604 with associating a stub application with the new file type. For example, the stub application can be registered in a file type registry, stored by an operating system, or otherwise associated with the new file type.

As used herein, a "stub application" is an executable application that responds to an operating system command to open a file without actually opening the file. Rather, the stub application can gather and communicates information about the file to a remote system to identify an application that can open the file. For example, the stub application can communicate the file name, extension (if any), file meta-data, and other information to aid the remote system in the selection of an application.

The flowchart continues to process 606 with receiving a request to open a file of the new file type. The request can be user generated or automated. For example: a user could double click an icon of a file to cause an operating system to generate an open file command; a file could be automatically opened by a scheduled action; or the file can be opened in any other known or convenient manner.

The flowchart continues to process 608 with executing the stub application to find the application. The stub application can transmit any information, meta-data, or other information about the file to the remote system to use in identifying an application that can open the file. More than one application can be identified. The information transmitted to the remote system can include the file itself.

The flowchart continues to decision process 610 with deciding whether to execute a remote application. The application in question can be executed to open the file, but the decision can be made whether to execute the application remotely or locally. The remote system can use different hardware than the local system. The decision can be based on user input, decision criteria specified in advance, or any other known or convenient manner of making the decision.

As used herein, "remote" is used to mean executed on a different computing system from a local computing system. A "different computing system" is used to mean a system including at least one processor not used by a "local system." The remote system can be coupled to a local system by a network, and need not be a large geographic distance apart to be considered "remote."

If the decision at process 610 is yes, then the flowchart continues to decision process 612 with deciding whether to transfer an entire file to the remote system. Not all of the file may be needed by the application. If so it may be possible to stream the file by transmitting only the portions of the file that are needed by the application to open the file. This may be helpful when opening a particularly large file. Various criteria can be used to determine whether to send the entire file or to stream the file, a few examples are: the latency of a connection, the size of the file, a user's preference, and any other known or convenient criteria can be used.

If the decision at process 612 is yes, then the flowchart continues to decision process 614 with streaming the file to the remote system to be opened. In streaming the file, portions of the file needed by the application can be sent to the remote system for use by the application. The remote application may also transmit changes, additions, or deletions to the local system to modify the file.

If the decision at process 612 is no, then the flowchart continues to decision process 616 with sending the file to the remote system to be opened. When transmitting the file, the file can be sent by file transfer protocol, a proprietary protocol, or any known or convenient protocol for sending a file between systems.

From process 614 or from process 616, the flowchart proceeds to process 620 with executing a remote application. The remote application can be executed on the remote system. For example, the remote application can be loaded from non-volatile storage into random access memory and executed on a processor of the remote machine. Other methods of executing a remote application can be used.

From process 620, the flowchart proceeds to process 622 with initiating local display of the remote application. The local display of the remote application can be made by locally displaying images of the application on the remote system. For example, screenshots of the remote application can be displayed. Alternatively, data describing the application on the remote system can be transmitted to the local system and displayed. Further any known or convenient manner of displaying or outputting data can be used.

From process 610, if the decision is no, the flowchart proceeds to decision process 624 with deciding whether to rent an application. If the decision is no then a locally executed application can be use to open the file. From decision process 624, if the decision is yes, the flowchart proceeds to process 626 with completing a rental transaction. Software can be rented to a local system and can be on any term, for example, an hour, a day, or a month.

From decision process 624, if the decision is no, or from process 626, the flowchart proceeds to process 628 with transferring an application to the local system. No locally installed application exists on the computing system; therefore, an application can be transmitted to the local system. "Yes" means that the application is transferred to the local system in whole for execution on the local system. "No" means the application can be executed as a streamed application on the local system.

From decision process 628, if the decision is yes the flowchart proceeds to process 634 with sending the application to the local system. The application can be transmitted by any application transmission protocol. For example, FTP, RTSP, HTTP, or another known or convenient protocol.

From decision process 628, if the decision is no, the flowchart proceeds to process 630 with streaming the application to the local system for execution. The application can be streamed by transmitting portions of the application needed for execution. More than one transmission can be made, and the streamed application can be saved in part on the local system. It is possible for all of the streamed application to be transmitted to the local system.

From process 630 or from process 634, the flowchart proceeds to process 632 with executing the application locally. Execution of the application can be as discussed above in regard to either the streamed application or the application sent to the local system. As used herein, "executed locally" is used to mean the application can use a processor and memory of the local system for execution.

From process 622, or from process 632, the flowchart proceeds to process 636 with opening the file. Using one or more of the methods discussed above, the application is executed. Once executed, the application can transfer portions of the file to memory and execute routines to view, modify or otherwise use the file. Having opened the file, the flowchart terminates.

Figure 7:
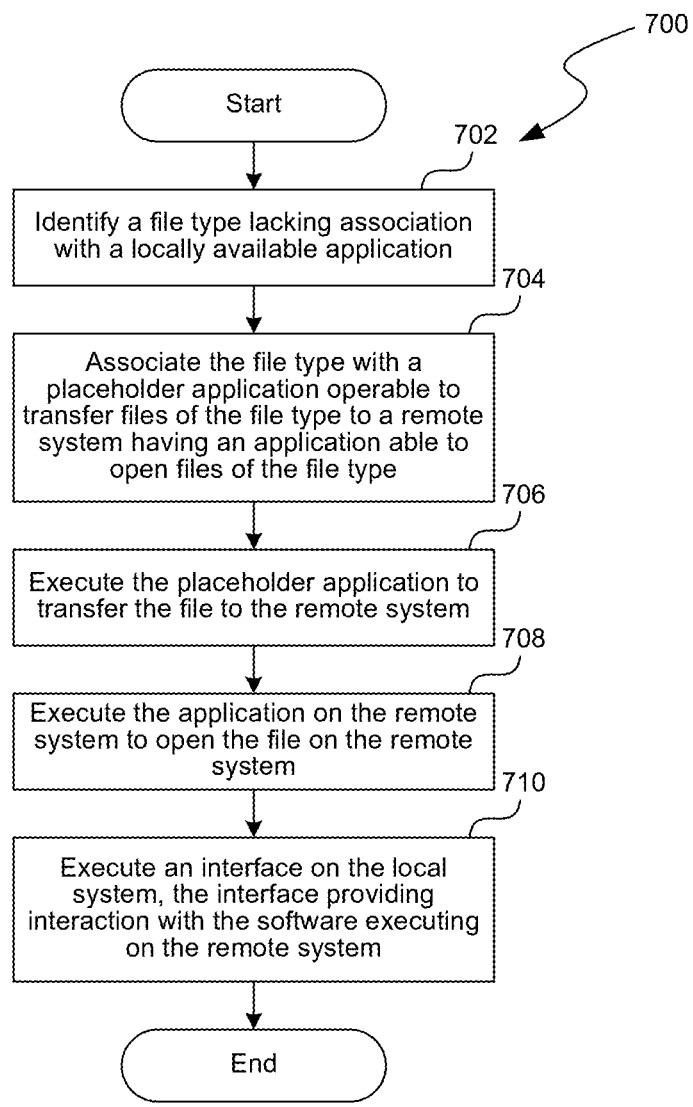
FIG. 7 depicts a flowchart of an example process for using a placeholder application to facilitate the opening of a file through a remote system which can be streamed and cached.

FIG. 7 depicts a flowchart of an example process for using a placeholder application to facilitate the opening of a file through a remote system.

The method is organized as a sequence of modules in the flowchart 700. However, it should be understood that these sequence of modules and modules associated with other methods described herein may be reordered for parallel execution or into different sequences of modules.

The flowchart starts at module 702 with identifying a file type lacking association with a locally available application. A method for identifying a file type lacking association is discussed above in regard to FIG. 6.

The flowchart continues to module 704 with associating the file type with a placeholder application operable to transfer files of the file type to a remote system having an application able to open files of the file type. The placeholder application can associate the file type using any known or convenient method. For example, a process for identifying a file type lacking association is discussed above in regard to FIG. 6.

As used herein, a "placeholder application" is an application that can collect information about a file on behalf of a remote system. The placeholder can be executed by an operating system to identify an application for the file. For example, the placeholder application can execute in response to receiving a system file open command.

The flowchart continues to module 706 with executing the placeholder application to transfer the file to the remote system. The operating system can receive a user command or other command to open a file and can automatically execute the placeholder application with instructions for the placeholder application to open the file. However, the placeholder application can ignore the open file request, and instead can transmit the file to a remote system for another application to open.

The flowchart continues to module 708 with executing the application on the remote system to open the file on the remote system. The execution can be initiated by an application on the remote system that is responsive to a command from the placeholder application. Once open, the application can open the file transferred by the placeholder application.

The flowchart continues to module 710 with executing an interface on the local system, the interface providing interaction with the software executing on the remote system. The interface can transmit and receive information with the local system. The information can describe or depict the actions of the application in opening the file. For example, images of the application and file can be displayed or, alternatively, data can be displayed. Further, any known or convenient manner of displaying the actions of the application can be displayed. Having executed an interface on the local system, the flowchart terminates.

Figure 8:
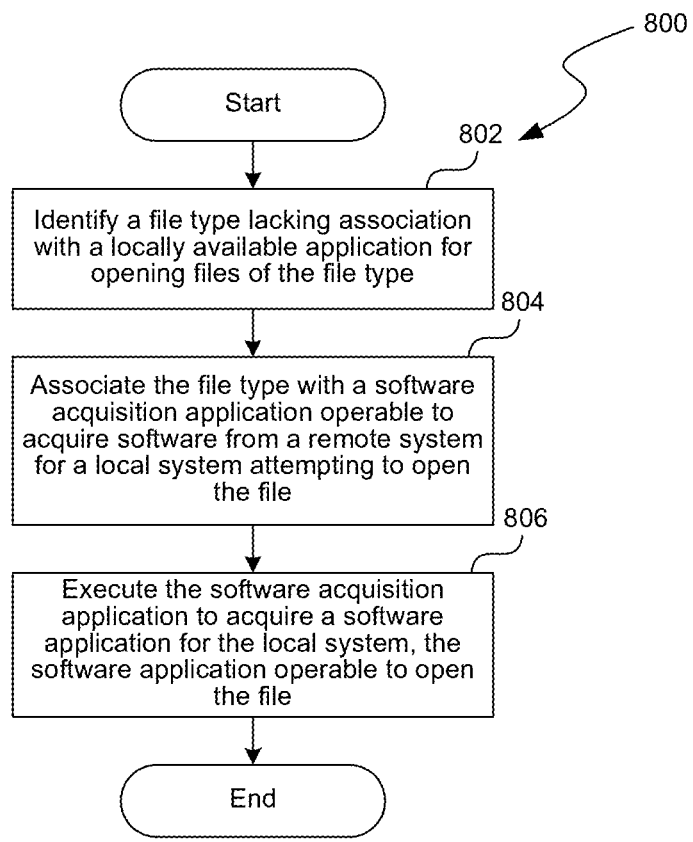
FIG. 8 depicts a flowchart of an example process for using a software acquisition application to acquire software/application for locally opening a file via file mapping.

FIG. 8 depicts a flowchart of an example process for using a software acquisition application to acquire software/application for locally opening a file.

The method is organized as a sequence of modules in the flowchart 800. However, it should be understood that these modules and those associated with other methods described herein may be reordered for parallel execution or into different sequences of modules.

The flowchart starts at module 802 with identifying a file type lacking association with a locally available application for opening files of the file type. A method for identifying a file type lacking association is discussed above in regard to FIG. 7.

The flowchart continues to module 804 with associating the file type with a software acquisition application operable to acquire software from a remote system for a local system attempting to open the file. As used herein, a "software acquisition" application is any application operable to download an application for execution on a local system in response to an open file command. The software acquisition application can be associated with the file type using one of the methods for identifying a file type discussed above in regard to FIG. 6.

The flowchart continues to module 806 with executing the software acquisition application to acquire a software application for the local system; the software application being operable to open the file. The software acquisition application can download the software application necessary to open the file. This action can include one or more of establishing an account, renting the application, downloading the application, and any other known or convenient application management action. Having executed an interface on the local system, the flowchart terminates.

FIG. 9 shows a diagrammatic representation of a machine in the example form of a computer system within which a set of instructions, for causing the machine to perform any one or more of the methodologies discussed herein, may be executed.

In the example of FIG. 9, the computer system 900 includes a processor, memory, non-volatile memory, and an interface device. Various common components (e.g., cache memory) are omitted for illustrative simplicity. The computer system 900 is intended to illustrate a hardware device on which any of the components depicted in the example of FIG. 1 (and any other components described in this specification) can be implemented. The computer system 900 can be of any applicable known or convenient type. The components of the computer system 900 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 900. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1100. The interface can include an analog modem, isdn modem, cable modem, token ring interface, satellite transmission interface (e.g., "direct PC"), or other interfaces for coupling a computer system to other computer systems. The interface 208 can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 9 reside in the interface.

In operation, the computer system 900 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is generally conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these terms and similar ones are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the terms "machine-readable medium" and "machine-readable storage medium" should be taken to include a single medium or multiple media (e.g., a centralized or distributed database, and/or associated caches and servers) that store the one or more sets of instructions. The terms "machine-readable medium" and "machine-readable storage medium" shall also be taken to include any medium that is capable of storing, encoding, or carrying a set of instructions for execution by the machine, and that cause the machine to perform any one or more of the methodologies of the presently disclosed technique and innovation.

In general, the routines executed to implement the embodiments of the disclosure may be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks (DVDs), etc.), among others, and transmission type media such as digital and analog communication links.

Figure 10:
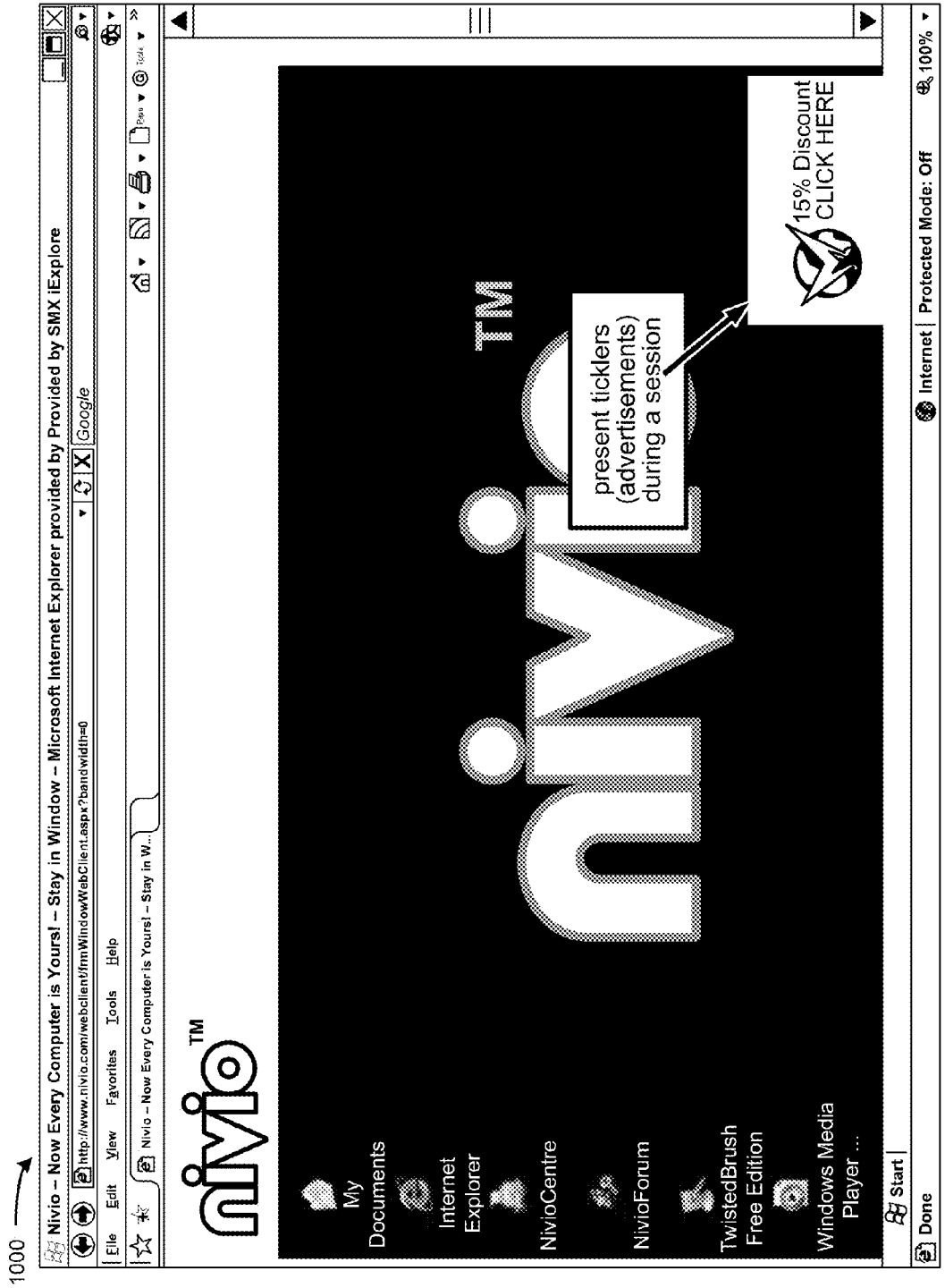
FIG. 10 depicts a screenshot of an example of a tickler ad displayed during use of a virtual machine.

FIG. 10 depicts a screenshot of an example of a tickler ad displayed during use of a virtual machine.

As used herein, a "tickler" is an attention-seeking advertisement temporarily displayed to a user. In use, a tickler can be made clickable, linking to a page displaying more details about the advertised product or service. A tickler is a great way to push out real time advertising and can be timed to attract attention at particular times. Where a user is logged out at a time to display advertising, the tickler can be delayed until the user logs in.

Figure 11:
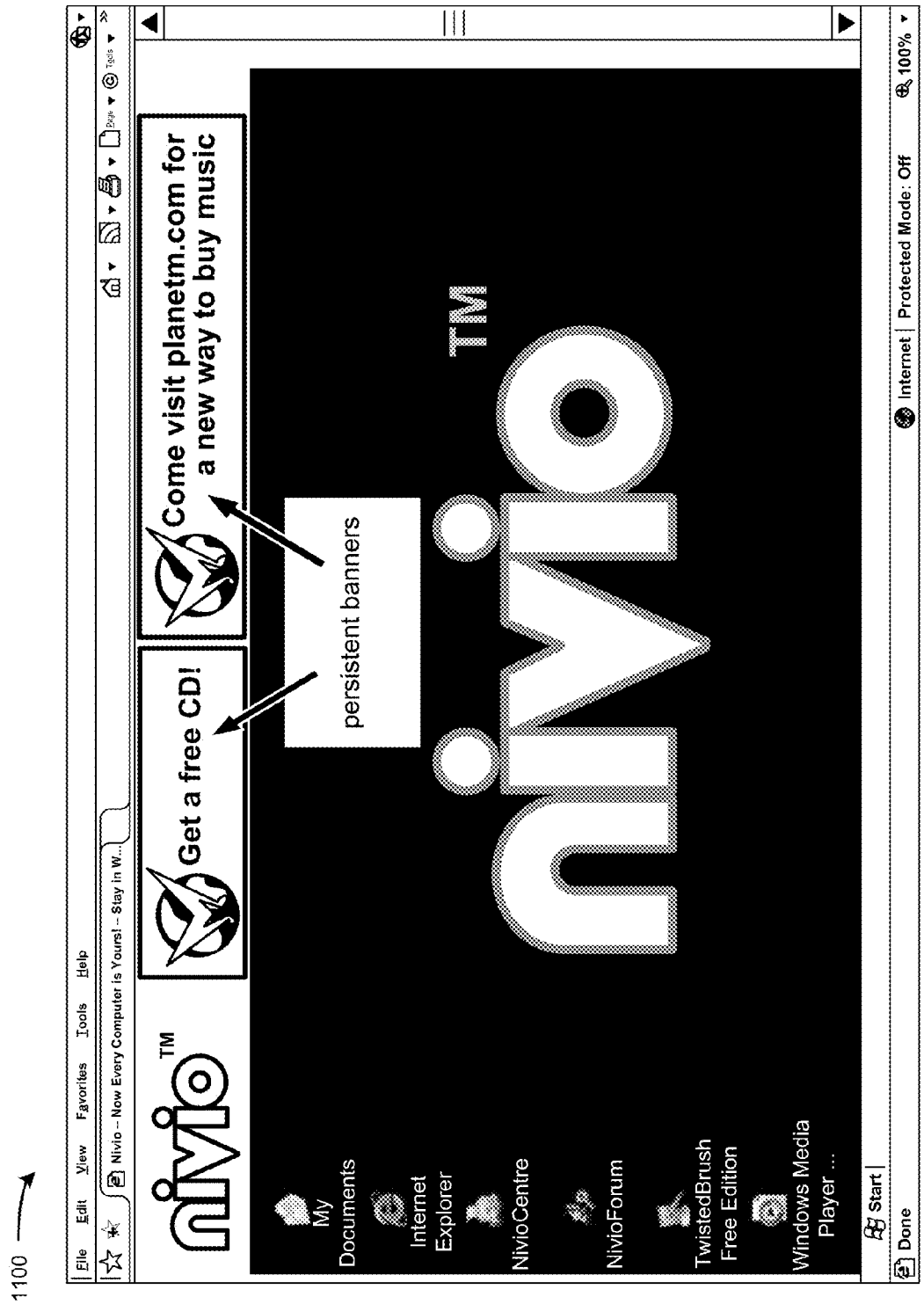
FIG. 11 depicts a screenshot of an example of a banner ad displayed during use of a virtual machine.

FIG. 11 depicts a screenshot of an example of a banner ad displayed during use of a virtual machine. Banner ads can be displayed in various locations on a screen during the use of a virtual machine. For example, a banner can be displayed at a login window, above a screen during use of a virtual machine, or in another known or convenient location.

Figure 12:
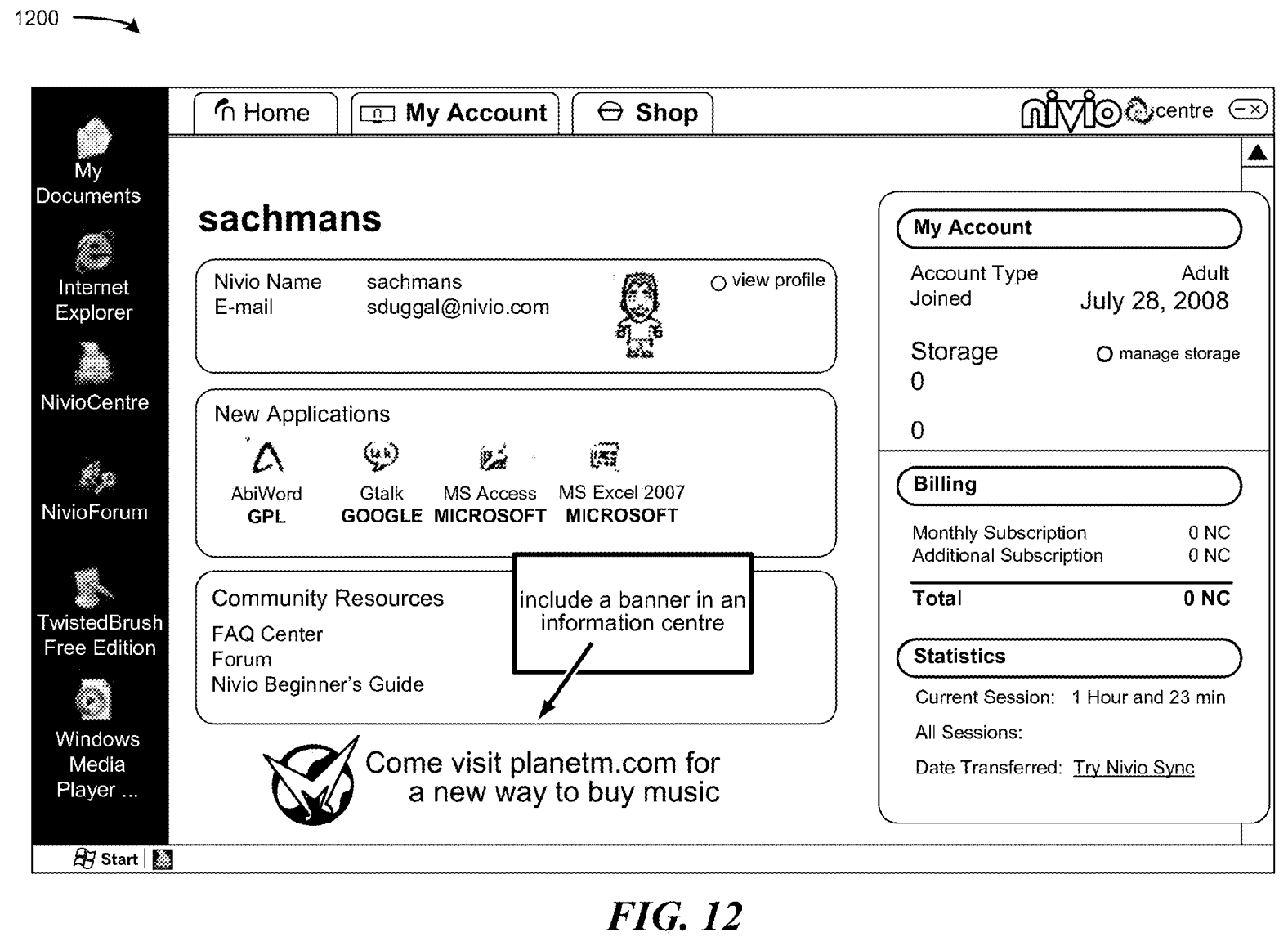

FIG. 12 depicts a screenshot of an example of a banner ad displayed in an information center. Banner ads can be placed in convenient locations in one or more locations in the information center.

Figure 13:
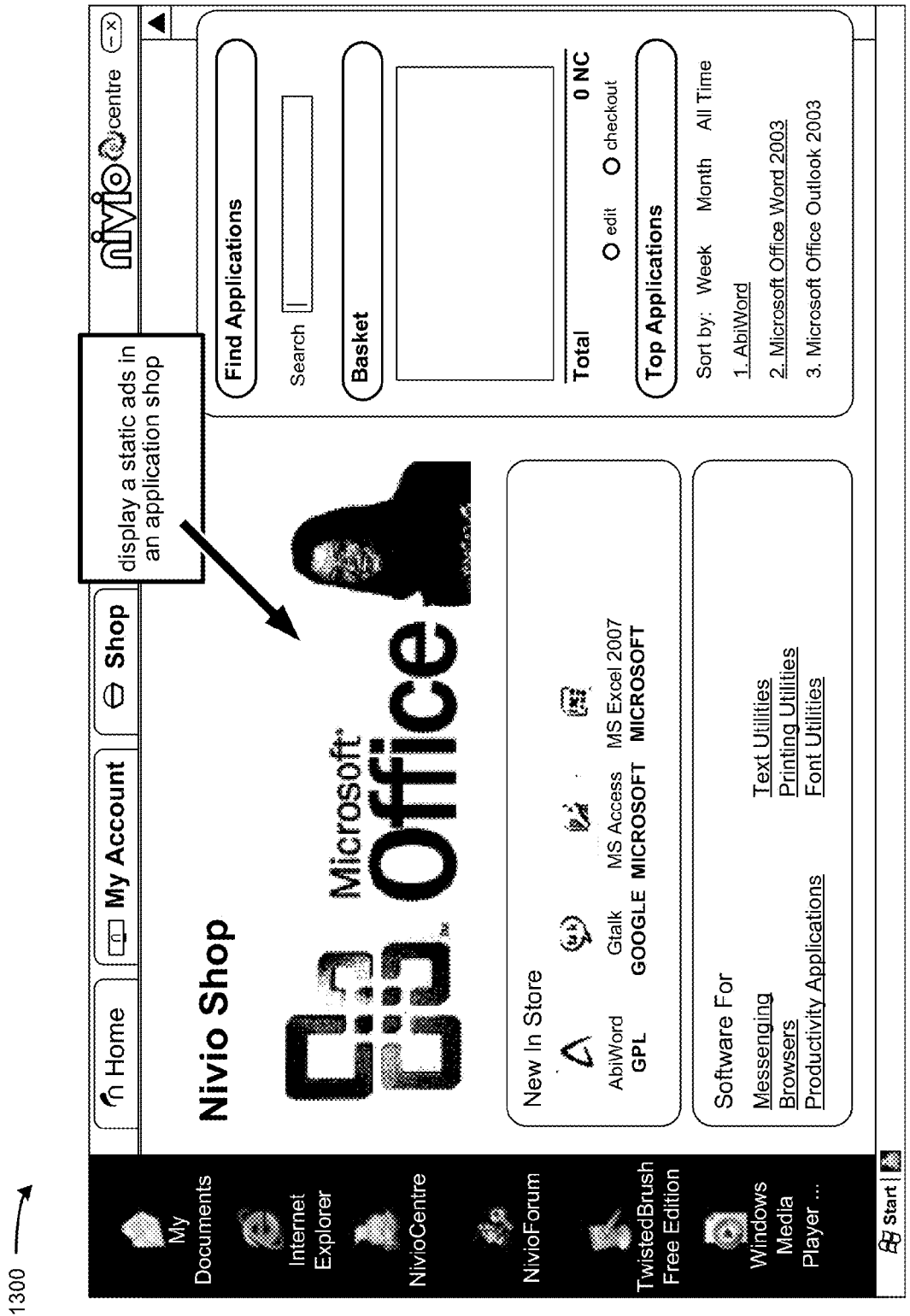
FIG. 13 depicts a screenshot of an example of an ad displayed in an application shop.

FIG. 13 depicts a screenshot of an example of an ad displayed in an application shop. The ad can but need not be associated with software for rent or sale in the application shop.

Figure 14:
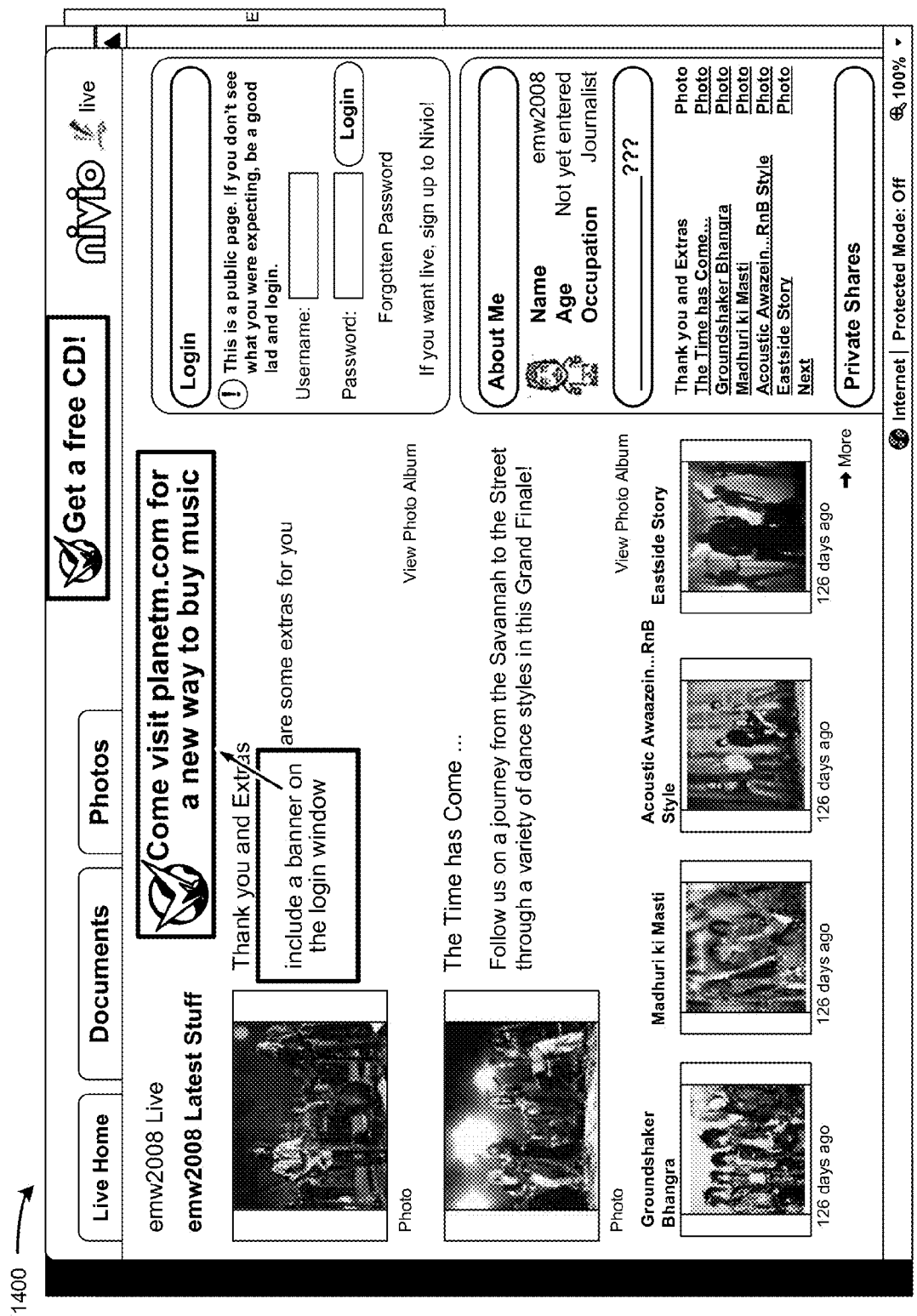
FIG. 14 depicts a screenshot of an example of an ad displayed in a window for an online sharing network.

FIG. 14 depicts a screenshot of an example of an ad displayed in a window for an online sharing network. One or more ads can be placed in an attention attracting location in the window.

Figure 15:
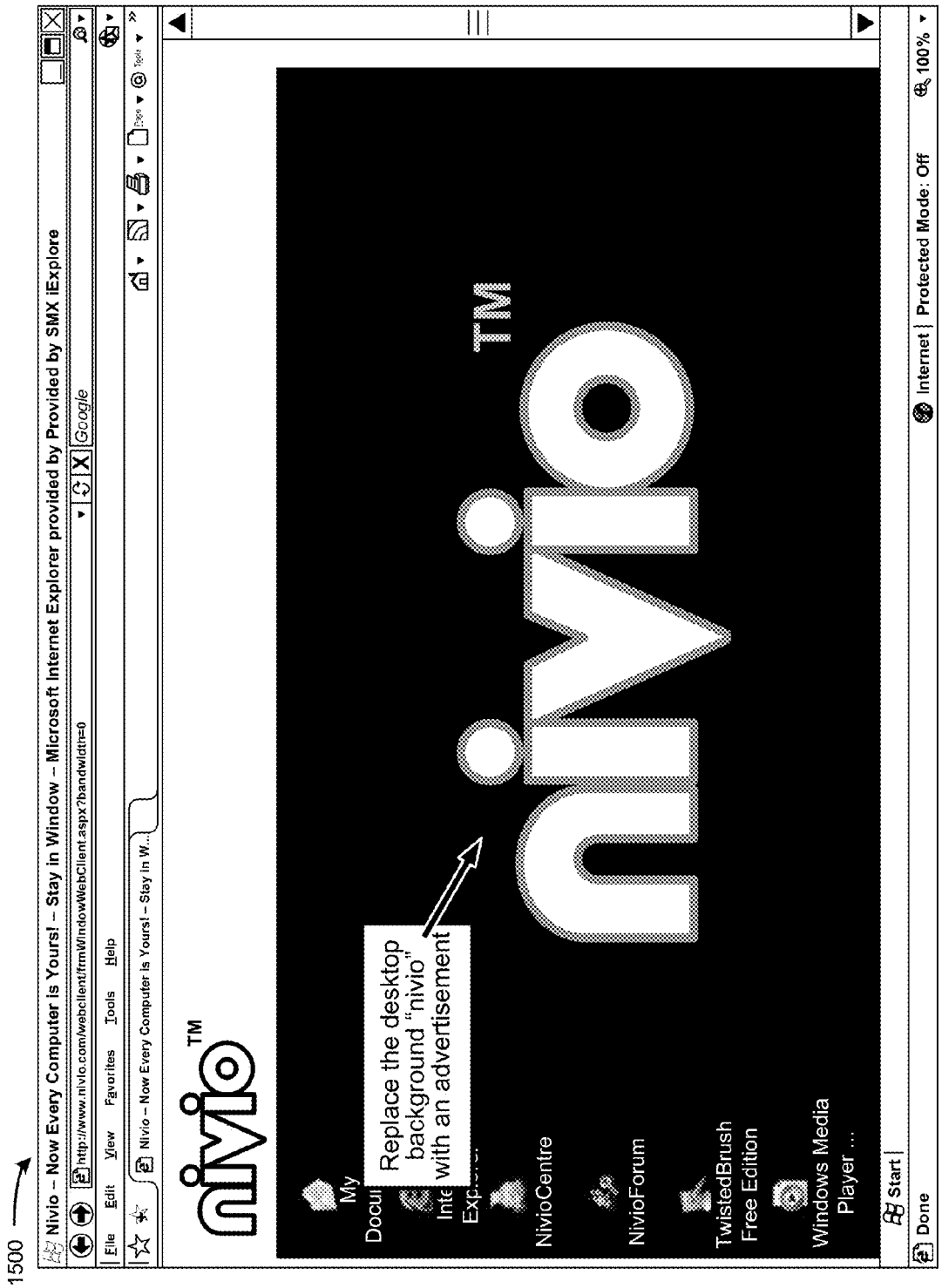
FIG. 15 depicts a screenshot of an example of advertising on the desktop of a virtual machine.

FIG. 15 depicts a screenshot of an example of advertising on the desktop of a virtual machine. In advertising on a virtual machine, it is possible to retain significant control over the user's experience. One aspect of the experience is the desktop; it is possible to replace the background of the desktop with advertising and rent this advertising space to advertisers.

Figure 16:
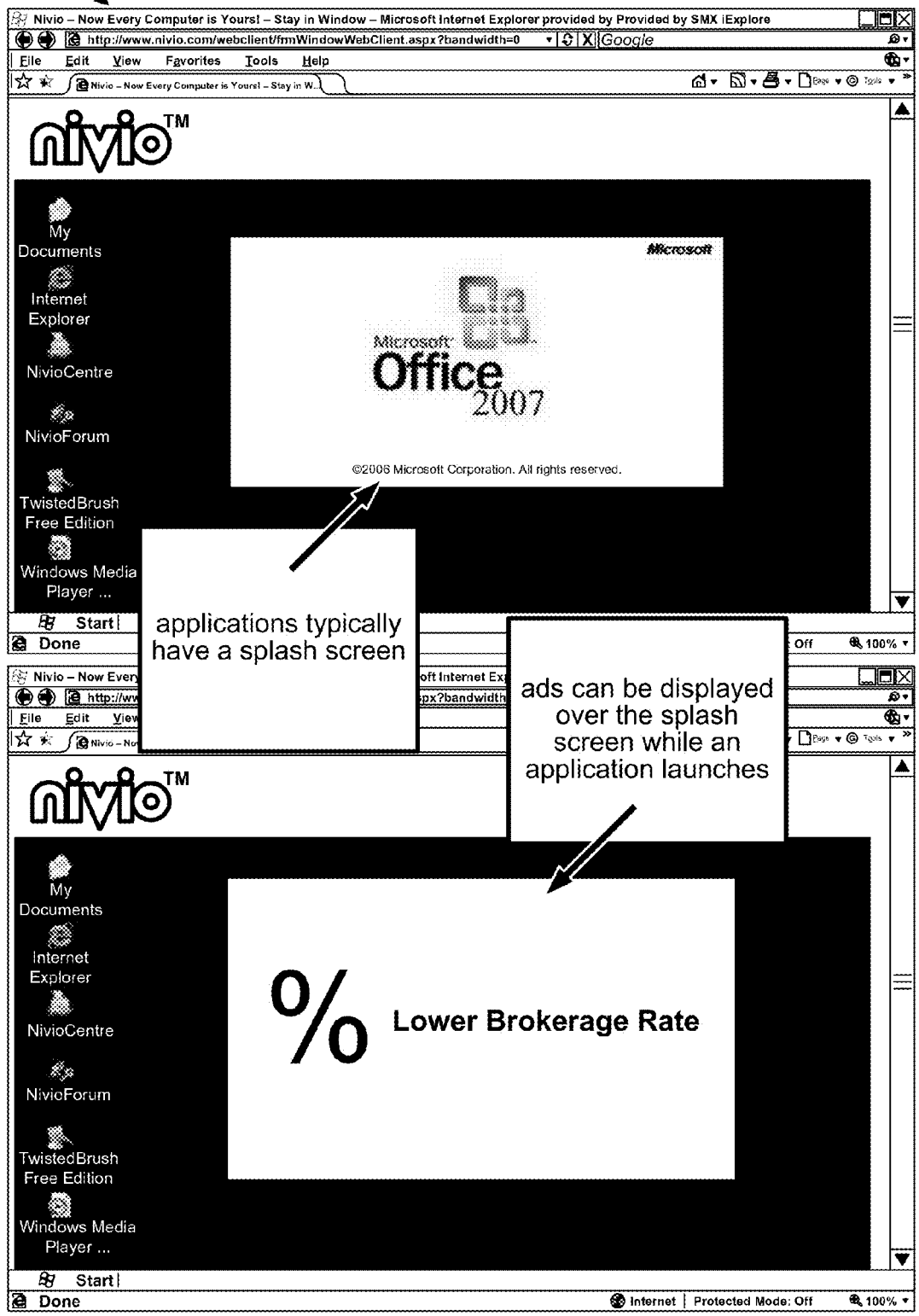
FIG. 16 depicts a screenshot of an example of an advertisement displayed over an application splash screen.

FIG. 16 depicts a screenshot of an example of an advertisement displayed over an application splash screen. When starting a program the program usually displays a splash screen, or image relating to the program being executed. This splash screen is displayed for a brief, but memorable period of time. Advertising can cover this splash screen. Therefore, this space can be considered advertising space, and rented or sold.

Figure 17A:
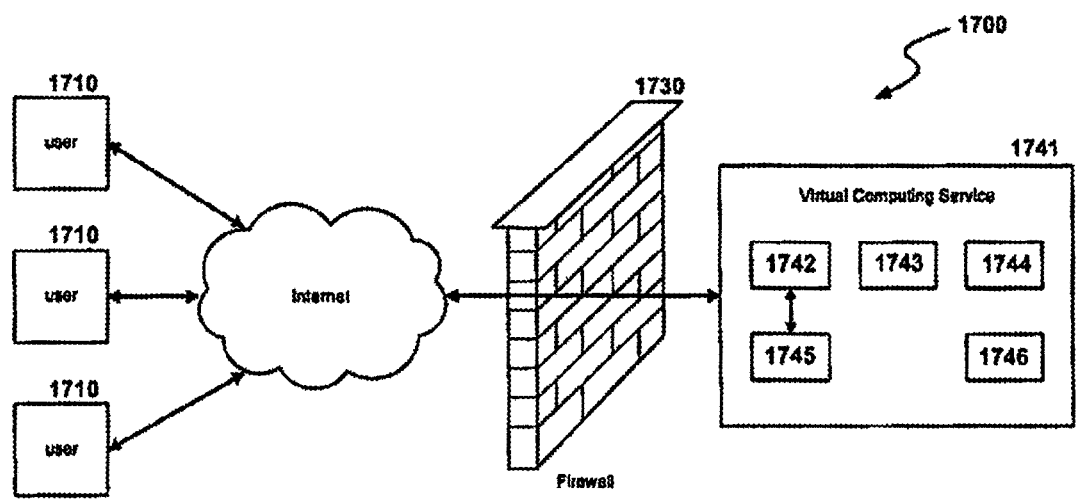
FIG. 17A is a block diagram illustrating a networked environment providing a virtual computing service to a user.

Referring to FIG. 17A, a block diagram illustrating a networked environment 1700 that provides a virtual computing service to a user is shown. A user may access the system via one or more user computing devices 1710. For example, the user may access the system from a work computer, a home computer, a mobile device, a thin-client device, an Internet kiosk, and so on. The devices 1710 connect to the virtual computing service 1741 via a firewall 1730 or other content filtering component to establish a secure protocol communications link between the devices 1710 and the virtual computing service 1741. In some cases, the system authenticates a user upon receiving a username and password, or via other credentials, and allows the user to connect to the virtual computing service 1741 after authentication. For example, the system queries an SQL database and/or active directory for the username and password. The SQL database and/or active directory may be grids comprised of duplicative SQL databases and active directories. Thus, the SQL database and/or active directory may be globally load balanced. Consequently, when one part of the SQL database or active directory fails, other parts remain active and functioning. In some cases, a virtual private network (VPN) synchronizes the duplicative SQL databases and active directories, such that they function seamlessly as a single SQL database and single active directory.

After authentication, the system initiates a secure protocol that creates a link from the user computing device 1710 to the virtual computing service 1741. The secure protocol may be the remote desktop protocol (RDP), or other similar protocols. The virtual computing service 1741 may be one server, or may be many networked servers that are synchronized (such as by a VPN) and optionally load balanced using load-balancing techniques. The virtual computing service 1741 interacts with the user computing device 1710 via a virtual computer desktop interface executed on a selected server. When a user wants to run an application on his/her computing device 1710 via the streamed desktop environment, an applications grid 1742 within the virtual computing service 1741 streams the application to the server providing the desktop environment to the user. In some cases, the applications grid 1742 contains multiple application streaming servers, may be synchronized by a VPN such as when the streaming server is accessed globally, and is optionally load-balanced using load-balancing techniques.

When a user subscribes to a new application or service (such as pays to use a specific application), the applications grid 1742 adds the transaction to a back office grid 1745, and streams the new application to the server providing the streamed desktop environment to the user. The back office grid 1745 may be comprised of multiple back office servers, synchronized when accessed globally, and optionally load-balanced using load-balancing techniques.

When a user saves a file to the virtual computing service 1741, the system stores the file to a storage grid 1743. The storage grid 1743 may be comprised of multiple storage drives. In some cases, multiple copies of the file will be saved to the storage drives of the storage grid 1743. Similarly, when a user opens or requests a saved file from the virtual computing service 1741, the system assembles or retrieves the file from multiple storage drives in the storage grid 1743 and streams the file to the user. Thus, the system may save parts or chunks of files to a number of servers within the virtual computing service and recreate the files when required. The system may synchronize and provide load balancing within the storage grid 1743. In some cases, the system may store user data at a local server, such as a server within their home country. Should a user access the data from other global locations, the system may transfer the data to other servers for access by the user.

Synchronization tool 1744 monitors and synchronizes some or all changes made to files within a specified folder within the virtual computer computing device 1741 or within the user computing devices 1710. Thus, the user always has access to the most current version of a file, regardless of the device 1710 used to connect to the virtual computing service 1741. The synchronization tool 1744 may be a separate module connected to the device 1710, or may be a module within device 1710.

Figure 17B:
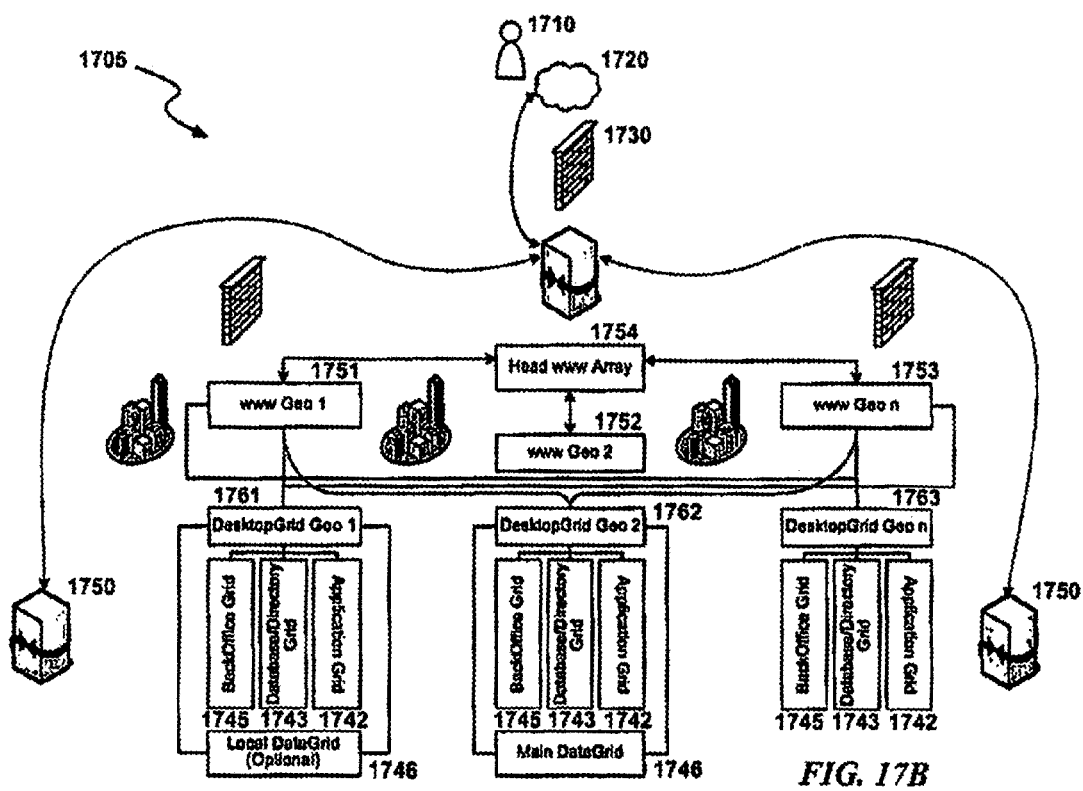
FIG. 17B is a block diagram illustrating a networked environment providing a global virtual computing service to a user.

Referring to FIG. 17B a block diagram illustrating a networked environment 1705 that provides a global virtual computing service to a user is shown. The global computing service 1741 may be a synchronized network 1750 accessed by a user 1710 via the internet 1720 and through firewalls 1730. The network 1750 may contain a plurality of server locations, such as a main location 1752 and various other globally located server locations 1751, 1753 accessed by the user via a head node server 1754. For example, when a user located in Switzerland accesses the network 1750, the array node 1754 identifies the location of the user as being in Switzerland, and connects the user 1710 to the main location 1752, also located in Switzerland. Users in other locations may connect to the network via array 1754 and communicate with other locations, such as locations 1751 or 1753.

For example, when a user logs into the system to access the virtual computing service, the system may determine the location of the user at that time and provide the virtual computing service to the user from a server near the user's current location. At times, the user may end a session without logging out, move to another location, and reconnect to the virtual computing service. In these cases, the system may determine the user's new location and use a more appropriate (e.g., geographically closer) server to provide the virtual computing service to the user. Thus, the system is able to dynamically change what server provides a streamed desktop to the user in order to provide the user with a fast and reliable computing environment.

Each of the locations includes a desktop environment grid 1761, 1762, 1763 that streams a desktop environment to the user 1710 computing device. Each of the desktop environment grids 1761, 1762, 1763 may include and/or communicate with data grids 1746, applications grids 1742, storage grids 1743, and/or back office grids 1745 located at the same location. In addition, the various desktop environment grids 1761, 1762, 1763 may communicate with other grids 1742-1746 at other locations, such as via virtual private networks established between the grids. The network 1750, via synchronization components, maintains synchronization between grids and may also move data from one location to another when needed. For example, the network may transfer data from the main data grid 1746 located at the main location 1752 to an alternative location 1753 without a data grid when a user accesses the network at the alternative location 1753.

Figure 18:
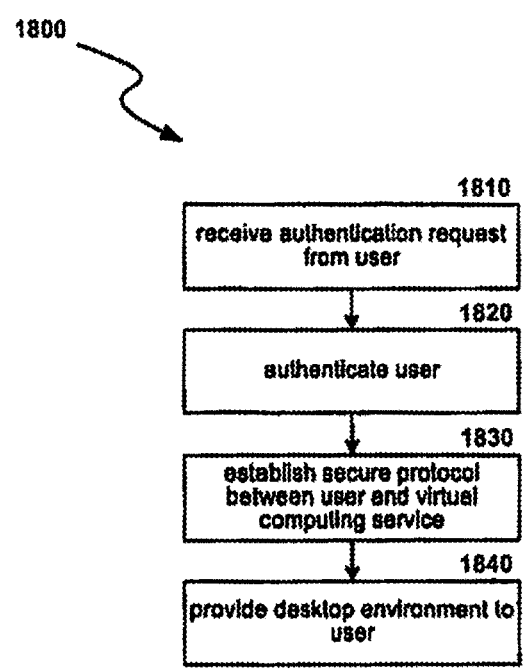
FIG. 18 is a flow diagram illustrating a routine for providing a desktop application to a user over the network.

Referring to FIG. 18, a flow diagram illustrating a routine 1800 for providing a virtual desktop to a user over the network is shown. In step 1810, the system receives an authentication request from a user. For example, a user accesses the system via device 1710 of FIG. 17A, and the system receives a username and password via a login page or other entrance page. In some cases, the system requires new users to create an account before accessing the virtual computing service in order to provide the user with security and private access. At that time, the user may choose and/or subscribe to desired applications and services. The user may choose services provided for free by the system (such as advertising supported applications), subscribe to services, or choose a combination of free and subscription based services. The subscriptions may be for certain time periods (e.g., monthly, yearly, and so on), or for a certain number of uses (e.g., 100 non-consecutive days of use, 50 uses, and so on). For example, the user creates an account, chooses a unique log-in and password, and subscribes to three applications for a month.

In step 1820, if the user provides acceptable credentials, the system authenticates the user. For example, the system matches the user credentials with an entry in an active directory. The system may also retrieve history, characteristics, profile, and other information about the user during authentication. The log-in procedure may authenticate the user against SQL databases and/or active directories to confirm that the user is authorized to access folders and services within the virtual computing service 1741.

In step 1830, the system establishes a secure protocol between the user computing device 1710 and the virtual computing service 1741 that ensures secure communications between the user computing device 1710 and the virtual computing service 1741. For example, the system establishes a RDP between the devices. In step 1840, the system enables the user to access computing resources, such as applications, data, and so on, via the secure protocol. For example, the system may stream a desktop environment via the secure protocol, and present the desktop to the user as if the desktop originated from the user device 1710. The system connects the user to a private virtual computing environment and presents a streamed image of a computer desktop interface to the user. In some examples, the system may supply the desktop using the grid computer architecture described herein, with separation between storage, application, and access functionalities. The virtual computing service 1741 may stream services to a virtual desktop environment provided to a user over the internet via multiple network servers, which may be located remotely from one another (such as in different locations, countries, continents, and so on) and may be load balanced such that if one server fails, the virtual computing service will provide these services to the user with minimal or no disruption. Thus, the user may not experience computer crashing or repair corrupted hardware.

Further, the system may provide secure tunneling, such as secure 128-bit bi-directional VPN tunneling, between all locations that synchronize some or all of the servers, allowing a user to login from anywhere in the world to his/her local server. The user may not perceive that the device 1741 is running from multiple servers in multiple locations.

The system may protect the virtual computing service 1741 and/or network 1750 with aggressive, load balanced, multi-layered firewalls. In some cases, each firewall may be supplied by a different vendor. The system protects the user and the virtual computing service 1741 from viruses, spam, spyware, or web pop-ups.

In some cases, in order to provide additional security, the system provides users with access to applications the user has already subscribed to or are already authorized by the system. Should the user wish to download and install new applications, the system may require the user to request permission. The system enables the users to install applications downloaded from the virtual computing service 1741 directly onto their user computing devices 1710, and may virtualize the applications during download. Controlling the installation of files (such as installation executables) may protect the system from viral infiltration, among other benefits.

In some cases, when the user runs an application, an applications grid 1742 comprising multiple application streaming servers will stream the application to the user. Application streaming is known, and can be accomplished through, for example, AppStream or Softricity software. The application streaming servers may be located in different parts of the world, load balanced to provide sustained operability, and synchronized by the VPN 1740 to simulate a unified user experience. Therefore, the user may not have to manually install new software and updates on different computers; updates are installed automatically at the device 1741 such that the user always has the latest version of a particular application. Alternatively, the user may opt to use a particular version of software, e.g., Microsoft Office 2003, rather than a later version, e.g., Microsoft Office 2007.

If the user creates a document and sends the document to the virtual computing service 1741, the system may store the document on a storage grid 1743 comprising multiple storage drives, and automatically create a backup copy of the document or of the changes made to the document, safeguarding the user against a possible loss of data. Thus, the user does not have to seek professional technical support to recover lost data stored on a local hard drive or backup created or changed data, as the system handles these operations for the user.

When the user opens a stored document, the system fetches or retrieves the document (or data related to the document) from multiple storage devices within the storage grid 1743 and streams the document to the user in a unified manner as provided by the VPN.

When the user exits the connection but does not log off, the system remains in an always-on state on the multiple servers on which it resides. Thus, the next time the user connects to the system, the resources and folders unique to the user are ready to be accessed. For example, the system may restore icon locations, open documents and applications, personal settings, and so on, as they were previously displayed. The user may also log off from the session before ending the link between the device 1710 and the service 1741. During a subsequent access, the system may present a virtual desktop in a normal state, with all applications closed. Thus, users who do not own a personal computer, e.g., internet café users, may personalize their own desktop and computing experience, among other benefits.

Display Examples

Figure 19:
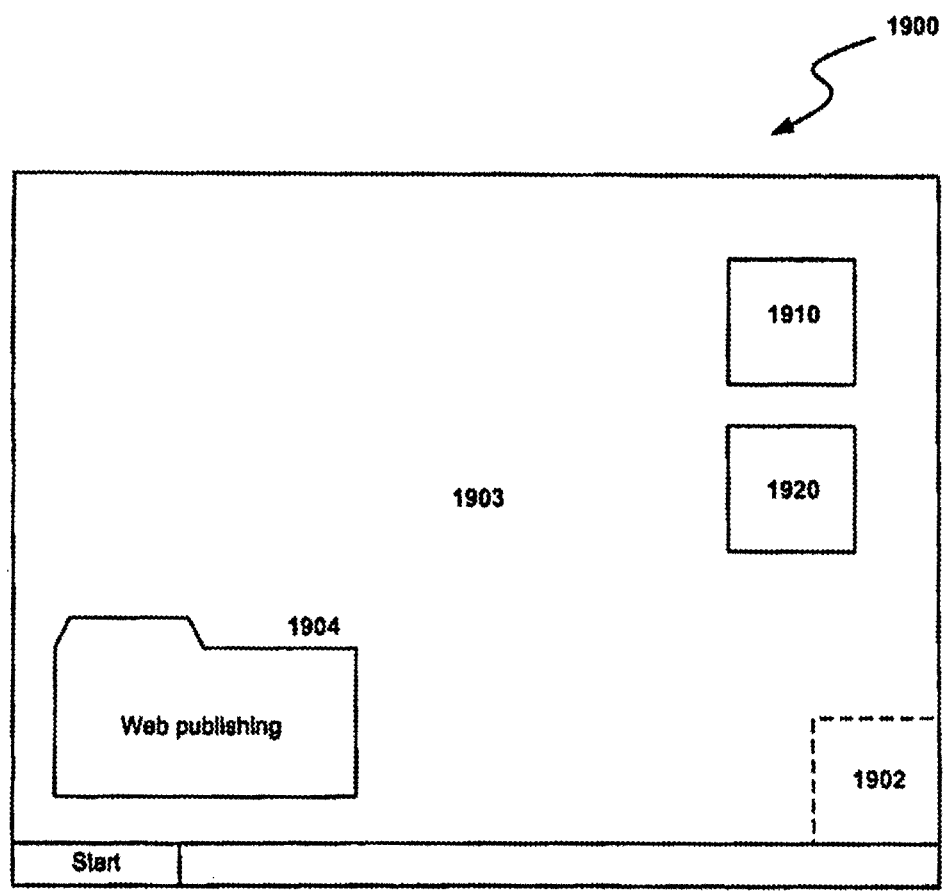
FIG. 19 is a pictorial diagram illustrating a virtual desktop environment of the virtual computing service.

FIG. 19 depicts the virtual computing desktop 1900 that may be the interface between the user and the virtual computing service 1741. The user is able to customize his virtual computing service 1741, such as display settings and the number and position of icons on his virtual desktop 1900. When the user disconnects from virtual computing service 1741 the device 1741 may not shut down, but instead may persist on the network servers to be ready for future sessions. The next time the user connects to the virtual computing service (either after logging off or being disconnected), the system presents the virtual computer desktop 1900 as previously displayed, including presenting files 1910 that were left open and applications 1920 that were left running by the user.

The presentation of advertisements on desktop 1900 may appear in different locations and forms, such as small, discreet pop-ups 1902 that fade in and out on the virtual desktop 1900, advertisements that occupy some or all of the background or wallpaper 1903 of the virtual computer desktop 1900, or other locations or forms.

FIG. 19 also depicts a web publishing folder 1904. In some cases, the system provides a web publishing folder 1904 that receives files or content from the user and posts the content with unique URLs to be later accessed by the user or other authorized users. The system may associate the content with the user or a group of users that each subscribe to the system. For example, a user may store a document in web publishing folder 1904 and attach a group of users to the document. The system may then associate the document with a unique URL related to the group of users. This may be beneficial to work groups, student groups, organizations, and other entities that collaborate on documents.

Figure 20:
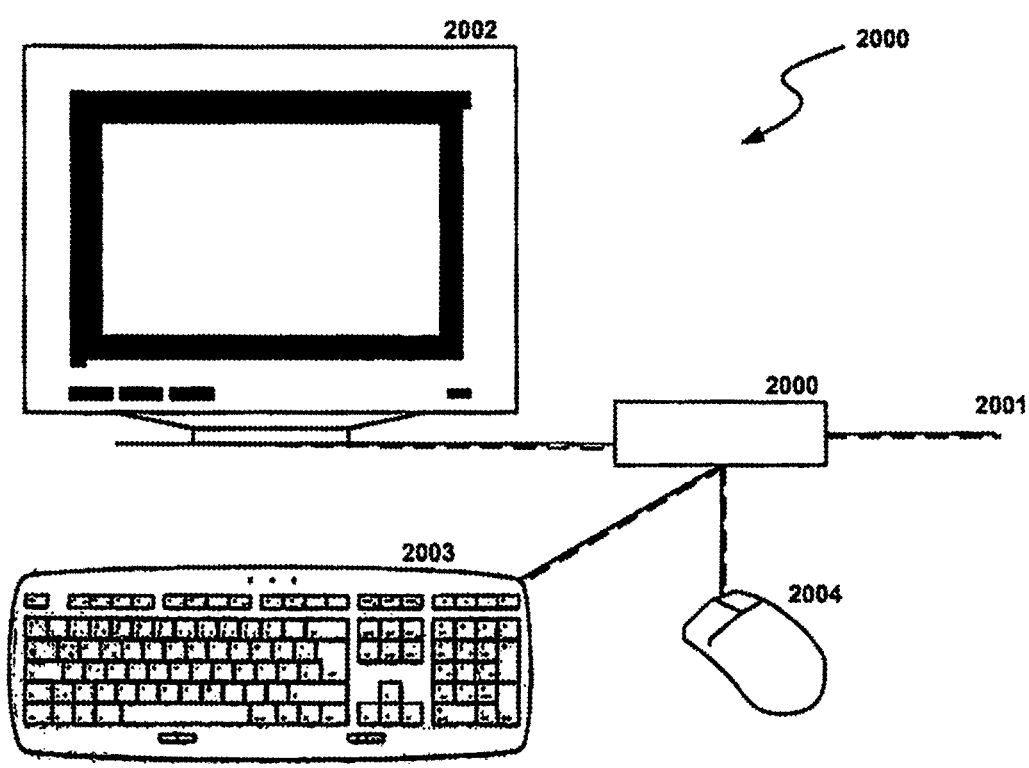
FIG. 20 is a pictorial diagram illustrating a user computing device according to some embodiments.

FIG. 20 depicts a diagram of a user device 2000 in configuration with a monitor 2002 (such as an LCD, CRT, or plasma display), keyboard 2003, mouse 2004, and internet connection 2001 in accordance with some embodiments. In the figure, solid lines indicate wired connections and dotted lines indicate wireless connections. The device may be a companion device. That is, the device is configured and developed to be used in collaboration with the virtual computing service 1741. Once a user creates an account and configures the companion device 2000 to the account, the system may automatically connect the user directly to the virtual computing service 1741 upon startup of the device. As can be seen in figure, the companion device makes it possible to have some or all of the functionality of a computer without physically owning a computer.

Figure 21:
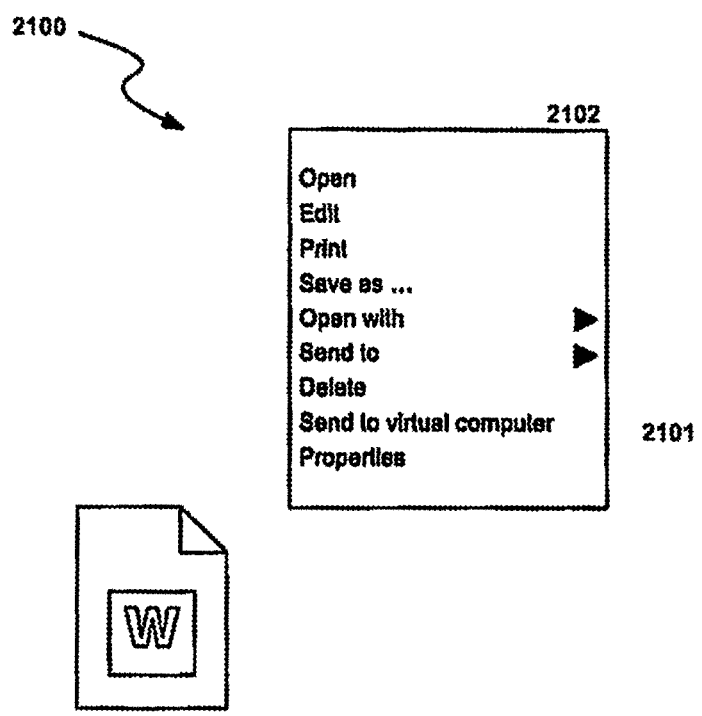
FIG. 21 is a pictorial diagram illustrating a display at the user computing device in some embodiments.

FIG. 21 is a pictorial diagram illustrating a plug-in module 2100 at the user computing device in some embodiments.

The optional plug-in 2100 may be installed at the user computing devices 1710 such that the option to send a file/folder directly to a user's virtual computing service 1741 is shown as a command 2101 on the right-click menu 2102 when a user right-clicks a document or icon related to a document. For example, after working with a document on the desktop of the user's device 1710 (and not on a virtual desktop 1900), the user may wish to send the document to the virtual computing service 1741. After right-clicking on the document (or selecting a menu from the application), the system presents a choice to send the document to the virtual computing service. The user may select the option, and the system sends the document to the device 1741, optionally creating a unique URL for the document. Thus, the user may share the document with other users (when the system relates the document to a URL associated with a group), or may send the document to the virtual computing service as a way of backing up the document.

Other plug-ins (not shown) may facilitate the sending and storing of documents to the virtual computing service 1741. For example, upon logging off from a session on a user computing device 1710, the system, via a dedicated plug-in, may prompt the user to send some or all created or modified documents to the virtual computing service 1741. Thus, the system may act as a daily or session-based backup system for the user. Additionally, the system may prompt the user to send some or all created modified documents to the virtual computing service 1741 for sharing purposed. The system may look to the metadata associated with the documents, and relate URLs to documents based on metadata. For example, the system may determine that the user has modified seven documents whose metadata indicate they are related with a financial department of a company, and relate URLs to those documents that are unique to the financial department.

Additionally, the system may enable the user to add applications to the virtual computing service. For example, a user may wish to use an application not currently provided by the streamed desktop environment, and add a plug-in or other module to the desktop environment that enables the user to access the application while working in the desktop environment. Thus, the system facilitates the extension of the service with new applications, plug-ins, and so on.

Displaying Content Based on Users

Figure 22:
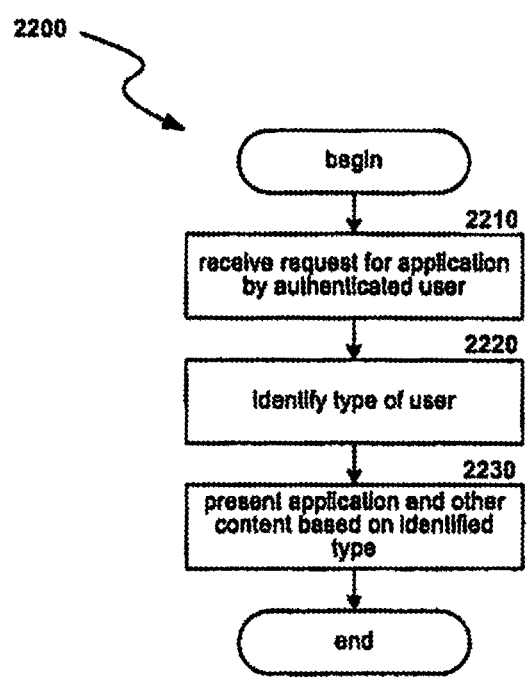
FIG. 22 is a flow diagram illustrating a routine for presenting applications to a user in some embodiments.

In some cases, the system may look to information related to a user and perform certain actions based on the information. Referring to FIG. 22, a flow diagram illustrating a routine 2200 for presenting applications to a user in some embodiments is shown. As will be appreciated, the applications may be standard desktop and/or web applications, or the applications could represent other various types of content. The presentation may be by way of immediate content and/or software provisioning. In step 2210, the system receives a request for an application from a user. For example, a user that is authenticated and logged into his/her virtual desktop 1900 clicks on a word processing application presented by the desktop 1900. In step 2220, the system identifies information related to the user. For example, the system determines that the user is a subscriber to the word processing application, or is a subscriber to other similar applications, or is not a subscriber and is effectively using the application without payment. In step 2230, the system presents the application or other content to the user based on the identified type of the user. For example, the system determines that the user has not subscribed to the word processing application, and presents the application along with a discreet pop-up box 1902 showing an advertisement.

The system may present some or all advertisements as described herein. For example, the system may present advertisements based on a determined location of the user, based on a determined time of access by the user, based on information related to a user's interests, profiles or history. Additionally, the system may review the content of documents created or accessed by the user, and target advertisements to the content. For example, the system may determine that the user is modifying a previously created document related to his/her chemistry class, and presents advertisements directed to science based magazines, science based television shows, and so on. Thus, the system may provide targeted advertisements to users related to topics the users are currently working on or thinking about, as revealed by the content of their documents.

As discussed herein, the system may display an advertisement based background on the virtual desktop 1900. In some cases, the system may do so for free users, allowing them access to some services in exchange for presenting advertisements to the user. For example, the system may provide a basic free service to users, having a sponsored virtual desktop background 1903 and sponsored applications. However, subscribers may view their desktops without advertisements.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶13, other aspects may likewise be embodied as a means-plus-function claim, or in other forms, such as being embodied in a computer-readable medium. (Any claims intended to be treated under 35 U.S.C. §112, ¶13 will begin with the words "means for".) Accordingly, the applicant reserves the right to add additional claims after filing the application to pursue such additional claim forms for other aspects of the disclosure.

What is claimed is:

1. A computer-implemented method comprising:
   implementing a virtual desktop service utilizing a network of servers that are connected and synchronized using a virtual private network protocol;
   establishing a secure protocol between a user computing device and the virtual desktop service;
   load-balancing amongst servers in functional network grids of the network of servers to select one or more servers, the functional network grids comprising an applications grid, a storage grid, and a back-office grid, wherein the application grid is configured to add a user transaction to the back-office grid;
   generating service components of the virtual desktop service utilizing the selected servers; and
   streaming the service components to the user computing device to provide a virtualized desktop to a user of the user computing device.

2. The computer-implemented method of claim 1, wherein establishing the secure protocol includes authenticating a user profile of the user computing device for access to the virtual desktop service.

3. The computer-implemented method of claim 1, wherein establishing the secure protocol includes providing a firewall between the service components and the user computing device.

4. The computer-implemented method of claim 1 wherein the network of servers are partitioned into the functional network grids respectively corresponding to the service components of the virtual desktop service.

5. The computer-implemented method of claim 4, wherein the functional network grids includes an applications grid, the applications grid including multiple application streaming servers.

6. The computer-implemented method of claim 4, wherein the functional network grids includes a back-office grid, the back-office grid including servers configured to track application subscription transactions of a user profile of the user.

7. The computer-implemented method of claim 4, wherein the functional network grids includes a storage grid, the storage grid including multiple storage devices.

8. A computer system comprising:
   a synchronization component configured to implement a virtual desktop service utilizing a network of servers that are connected and synchronized using a virtual private network protocol;
   a firewall component configured to establish a secure protocol between a user computing device and the virtual desktop service; and
   the network of servers partitioned into functional network grids, each grid configured to load-balance to select one or more servers to generate a service component, wherein service components of the functional network grids implement the virtual desktop service, the functional network grids comprising an applications grid, a storage grid, and a back-office grid, wherein the application grid is configured to add a user transaction to the back-office grid; and
   wherein the firewall component is configured to stream the service components to the user computing device to provide a virtualized desktop to a user of the user computing device.

* * * * *